US012738201B2

(12) United States Patent
Yun et al.

(10) Patent No.: US 12,738,201 B2
(45) Date of Patent: Sep. 15, 2026

(54) EMISSION SELECTION DRIVER AND EMISSION SELECTION GATE DRIVER INCLUDING THE SAME

(71) Applicant: Samsung Display Co., Ltd., Yongin-Si (KR)

(72) Inventors: Eseudeo Yun, Yongin-si (KR); Nackhyeon Keum, Yongin-si (KR); Kyung-Hoon Kim, Yongin-si (KR); Yongchan Kim, Yongin-si (KR); Jaehyuk Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/012,860

(22) Filed: Jan. 8, 2025

(65) Prior Publication Data

US 2025/0342793 A1 Nov. 6, 2025

(30) Foreign Application Priority Data

May 2, 2024 (KR) ........................ 10-2024-0058562

(51) Int. Cl.
*G09G 3/32* (2016.01)
*G09G 3/3233* (2016.01)
*G09G 3/3266* (2016.01)

(52) U.S. Cl.
CPC ............. *G09G 3/32* (2013.01); *G09G 3/3233* (2013.01); *G09G 3/3266* (2013.01); *G09G 2300/0814* (2013.01); *G09G 2300/0819* (2013.01); *G09G 2300/0861* (2013.01); *G09G 2310/0267* (2013.01); *G09G 2310/0286* (2013.01); *G09G 2310/08* (2013.01); *G09G 2330/022* (2013.01)

(58) Field of Classification Search
CPC ......... G09G 3/3233; G09G 2310/0289; G09G 3/3266; G09G 2310/0243; G09G 3/32; G09G 2310/0267; G09G 2330/022; G09G 2310/0202; G09G 2300/0861; G09G 2300/0819; G09G 2320/0233; G09G 3/3225; G09G 2310/08; G09G 2300/0814; G11C 19/28
See application file for complete search history.

(56) References Cited

U.S. PATENT DOCUMENTS

| | | | | |
|---|---|---|---|---|
| 8,358,299 B2 | 1/2013 | Chaji et al. | | |
| 9,786,384 B2 | 10/2017 | Lee et al. | | |
| 2005/0264496 A1* | 12/2005 | Shin | G09G 3/3233 | 345/76 |
| 2005/0285827 A1* | 12/2005 | Eom | G09G 3/3266 | 345/76 |
| 2006/0145964 A1* | 7/2006 | Park | G09G 3/3266 | 345/76 |
| 2010/0007649 A1* | 1/2010 | Tanikame | G09G 3/3291 | 345/76 |

(Continued)

FOREIGN PATENT DOCUMENTS

KR 10-2015-0070899 A 6/2015

*Primary Examiner* — Dismery Mercedes
(74) *Attorney, Agent, or Firm* — Innovation Counsel LLP

(57) ABSTRACT

An emission selection driver includes an emission driver configured to output an emission signal from an emission output node, and a selection driver connected to the emission output node and configured to output a selection signal based on a next emission signal and an enable signal.

21 Claims, 31 Drawing Sheets

(56) References Cited

U.S. PATENT DOCUMENTS

| | | | | |
|---|---|---|---|---|
| 2013/0069854 | A1* | 3/2013 | Park | G09G 3/3233 345/82 |
| 2016/0210892 | A1* | 7/2016 | Ohara | G09G 3/2022 |
| 2016/0379558 | A1* | 12/2016 | Jeon | G11C 19/184 345/213 |
| 2021/0142725 | A1* | 5/2021 | Yu | G09G 3/3233 |
| 2022/0044620 | A1* | 2/2022 | Seo | G09G 3/2092 |
| 2022/0068202 | A1* | 3/2022 | Kim | G09G 3/3233 |
| 2022/0157250 | A1* | 5/2022 | Kim | G09G 3/3225 |
| 2022/0199013 | A1* | 6/2022 | Matsueda | G09G 3/3233 |
| 2025/0239208 | A1* | 7/2025 | Jang | G09G 3/32 |

* cited by examiner

EMISSION SELECTION DRIVER AND EMISSION SELECTION GATE DRIVER INCLUDING THE SAME

This application claims priority, under 35 USC § 119, to Korean Patent Application No. 10-2024-0058562 filed on May 2, 2024 in the Korean Intellectual Property Office (KIPO), the entire disclosure of which is incorporated by reference herein.

BACKGROUND

1. Field

Embodiments of the present inventive concept relate to an emission selection driver and an emission selection gate driver including the same. More particularly, the present inventive concept relates to an emission selection driver and an emission selection gate driver including the same applicable to a display device performing MFD (Multi-Frequency Driving).

2. Description of the Related Art

Recently, demand has been rising to reduce the power consumption of a display device. In particular, demand to reduce the power consumption of a display device in portable devices such as smartphones and tablet computers. One way to reduce the power consumption of the display device is by reducing the driving frequency of a display panel.

For example, when a still image is displayed on an entire area of the display panel or the display panel operates in AOD (Always-On Display) mode, the entire area of the display panel may be driven at a low frequency. Further, when the still image is displayed only on a part of the display panel, the part of the display panel may be driven at the low frequency.

In order for the display panel to be driven at the low frequency, the signals applied to pixels of the display panel are partially masked. However, when part of the signals has pulses in a frame period and is masked by a global scan signal, only a part of the pulses may be masked. This may result in a masking operation malfunction.

SUMMARY

Embodiments of the present inventive concept provide an emission selection driver applicable to a display device performing Multi-Frequency Driving (MFD).

Embodiments of the present inventive concept provide an emission selection gate driver including the emission selection driver.

In an embodiment of an emission selection driver according to the present inventive concept, the emission selection driver includes an emission driver configured to output an emission signal from an emission output node, and a selection driver connected to the emission output node and configured to output a selection signal based on a next emission signal and an enable signal.

In an embodiment, the enable signal may be a global scan signal, and the emission signal, the next emission signal, and the selection signal are progressive scan signals.

In an embodiment, a pulse of the selection signal and a pulse of the emission signal may be equal in duration and timing.

In an embodiment, the selection driver may include a first selection transistor including a gate electrode connected to a selection control node, a first electrode receiving the emission signal, and a second electrode outputting the selection signal, a second selection transistor including a gate electrode receiving the next emission signal, a first electrode receiving the enable signal, and a second electrode connected to the selection control node, and a selection capacitor including a first electrode receiving the emission signal and a second electrode connected to the selection control node.

In an embodiment, the first selection transistor and the second selection transistor may be P-type transistors.

In an embodiment, when the next emission signal maintains a first level, the selection signal may be equal to the emission signal.

In an embodiment, when the next emission signal has a first level and the enable signal has the first level, the selection signal may be equal to the emission signal.

In an embodiment, the second selection transistor may be turned on in response to the next emission signal having the first level to provide the enable signal having the first level to the selection control node, and the first selection transistor may be turned on in response to a voltage of the selection control node having the first level to output the emission signal as the selection signal.

In an embodiment, when the next emission signal has a first level and the enable signal has a second level, the selection signal may maintain a previous state.

In an embodiment, the second selection transistor may be turned on in response to the next emission signal having the first level to provide the enable signal having the second level to the selection control node, and the first selection transistor may be turned off in response to a voltage of the selection control node having the second level.

In an embodiment, when the next emission signal has a second level, a voltage of the selection control node may maintain a previous state.

In an embodiment, when the previous state of the voltage of the selection control node is the first level, the selection signal may be equal to the emission signal.

In an embodiment, the second selection transistor may be turned off in response to the next emission signal having the second level, and the first selection transistor be turned on in response to the previous state of the voltage of the selection control node having the first level to output the emission signal as the selection signal.

In an embodiment, when the previous state of the voltage of the selection control node is the second level, the selection signal may maintain the previous state.

In an embodiment, the second selection transistor may be turned off in response to the next emission signal having the second level, and the first selection transistor may be turned off in response to the previous state of the voltage of the selection control node having the second level.

In an embodiment, the emission driver may include a first emission transistor including a gate electrode receiving an emission clock signal, a first electrode receiving an emission input signal, and a second electrode connected to an emission control node, a second emission transistor including a gate electrode connected to the emission control node, a first electrode receiving a high gate voltage, and a second electrode connected to an inverted emission control node, a third emission transistor including a gate electrode connected to the emission control node, a first electrode receiving a low gate voltage, and a second electrode connected to the inverted emission control node, a fourth emission transistor including a gate electrode connected to the inverted emission control node, a first electrode receiving the high gate voltage, and a second electrode connected to an emission output node outputting the emission signal, a fifth emission transistor including a gate electrode connected to the emission control node, a first electrode receiving the low gate voltage, and a second electrode connected to the emission output node, a first emission capacitor including a first electrode connected to the emission control node and a second electrode connected to the emission output node, and a second emission capacitor including a first electrode receiving the high gate voltage and a second electrode connected to the inverted emission control node.

In an embodiment, the emission control node may include a first emission control node and a second emission control node, and the emission driver may include a sixth emission transistor including a gate electrode receiving the low gate voltage, a first electrode connected to the first emission control node, and a second electrode connected to the second emission control node.

In an embodiment of an emission selection gate driver according to the present inventive concept, the emission selection gate driver includes an emission driver configured to output an emission signal from an emission output node, a selection driver connected to the emission output node and configured to output a selection signal based on a next emission signal and an enable signal, and a gate driver configured to output a gate signal that is masked based on the selection signal.

In an embodiment, the enable signal may be a global scan signal, and the emission signal, the next emission signal, and the selection signal may be progressive scan signals.

In an embodiment, a pulse of the selection signal and a pulse of the emission signal may be equal in duration and timing.

In an embodiment, the selection driver may include a first selection transistor including a gate electrode connected to a selection control node, a first electrode receiving the emission signal, and a second electrode outputting the selection signal, a second selection transistor including a gate electrode receiving the next emission signal, a first electrode receiving the enable signal, and a second electrode connected to the selection control node, and a selection capacitor including a first electrode receiving the emission signal and a second electrode connected to the selection control node.

In an embodiment, a duration in which the selection signal has the second level includes activation pulses of the gate signal.

According to the emission selection driver and the emission selection gate driver including the emission selection driver, the selection signal may be generated based on the next emission signal and the enable signal. Therefore, the selection signal and the emission signal may be equal as a pulse length and a timing. The gate signal may be masked based on the selection signal having a same pulse length and timing as the emission signal, and since the selection signal is a sequential scan signal, an erroneous operation of masking only a part of activation pulses of the gate signal may not be generated.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
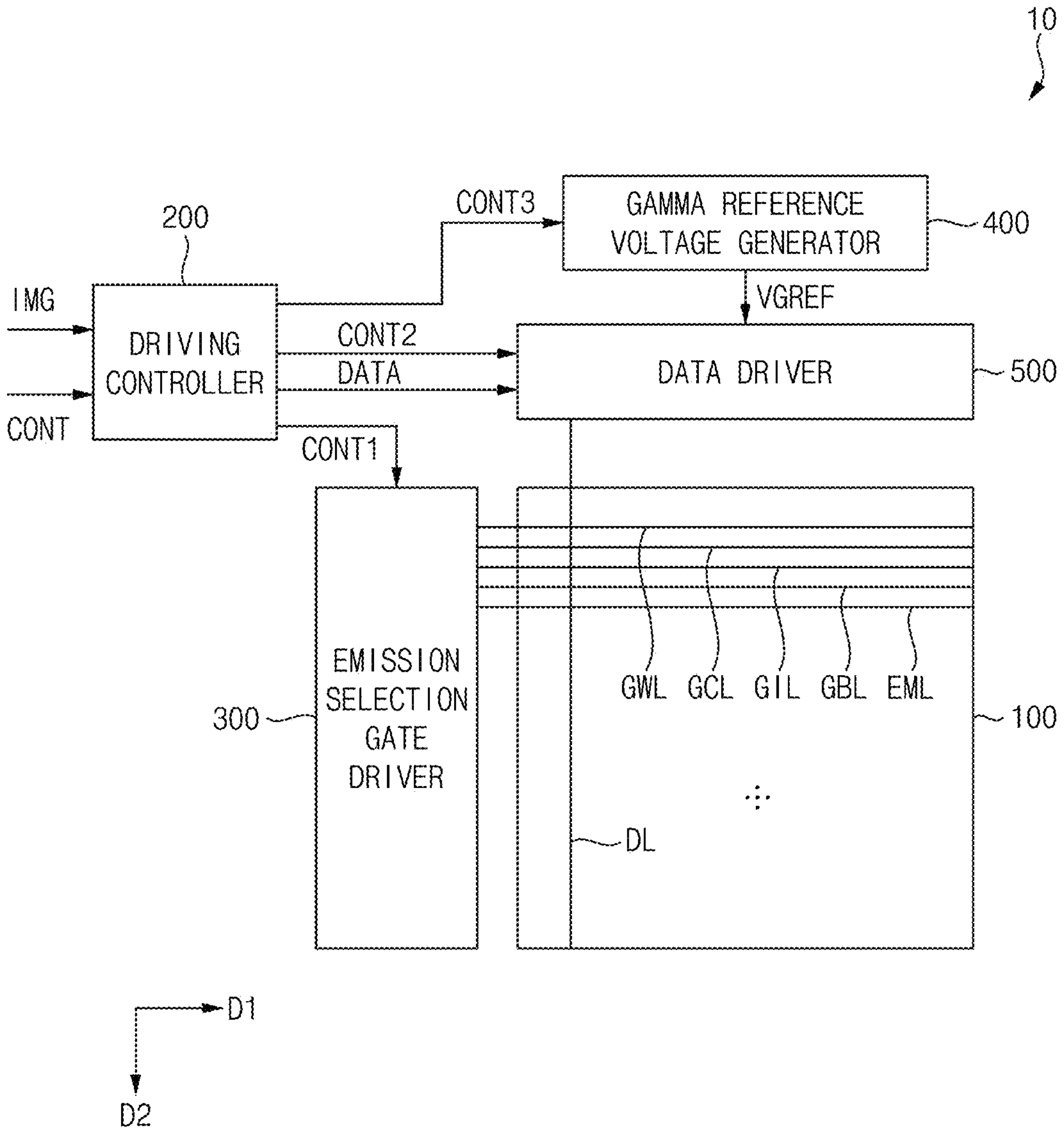
FIG. 1 is a block diagram showing a display device according to embodiments of the present inventive concept.

FIG. 1 is a block diagram showing a display device 10 according to embodiments of the present inventive concept.

Referring to FIG. 1, a display device 10 may include a display panel 100 and a display panel driver. The display panel driver may include a driving controller 200, an emission selection emission selection gate driver 300, a gamma reference voltage generator 400, and a data driver 500.

The display panel 100 may include a display region for displaying an image and a peripheral region disposed adjacent to the display region.

The display panel 100 may include gate lines GWL, GCL, GIL, GBL, emission lines EML, data lines DL, and pixels electrically connected to the gate lines GWL, GCL, GIL, GBL, the emission lines EML, and the data lines DL, respectively. The gate lines GWL, GCL, GIL, GBL may extend in a first direction D1, the emission lines may extend in the first direction D1, and the data lines DL may extend in a second direction D2 crossing the first direction D1.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the emission selection gate driver 300 based on the input control signal CONT, and output the first control signal CONT1 to the emission selection gate driver 300. The first control signal CONT1 may include a vertical start signal, a gate clock signal, and an emission clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The emission selection gate driver 300 may generate gate signals for driving the gate lines GWL, GCL, GIL, GBL in response to the first control signal CONT1 received from the driving controller 200. The emission selection gate driver 300 may output the gate signals to the gate lines GWL, GCL, GIL, GBL. The emission selection gate driver 300 may generate emission signals for driving the emission lines EML in response to the first control signal CONT1 received from the driving controller 200. The emission selection gate driver 300 may output the emission signals to the emission lines EML.

In FIG. 1, for convenience of explanation, the emission selection gate driver 300 will be described as being disposed on a first side of the display panel 100. However, it should be understood that the present inventive concept is not limited to the particular arrangement that is depicted in FIG. 1. The emission selection gate driver 300 may be disposed on either side of the display panel 100. For example, the emission selection gate driver 300 may be implemented as two sections, one part disposed on the first side of the display panel 100 and other part of the emission selection gate driver 300 disposed on a second side of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 2:
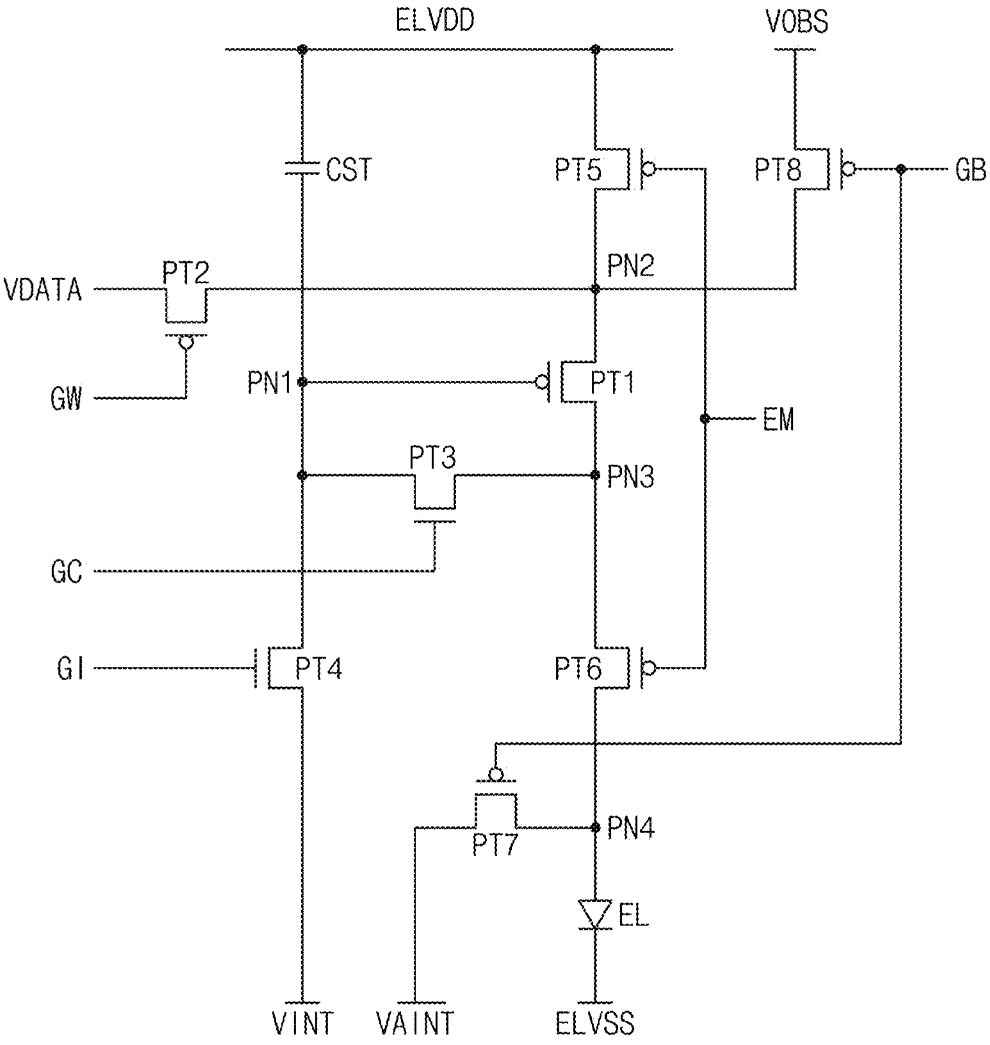
FIG. 2 is a circuit diagram showing an example of a pixel of FIG. 1.

FIG. 2 is a circuit diagram showing an example of a pixel of FIG. 1.

Referring to FIGS. 1 and 2, the pixel may include first to eighth pixel transistors PT1 to PT8, a storage capacitor CST, and a light emitting element EL.

The first pixel transistor PT1 may include a gate electrode connected to a first pixel node PN1, a first electrode connected to a second pixel node PN2, and a second electrode connected to a third pixel node PN3. The first pixel transistor PT1 may generate a driving current based on a difference between a voltage of the first pixel node PN1 and a voltage of the second pixel node PN2.

The second pixel transistor PT2 may include a gate electrode receiving a write gate signal GW, a first electrode receiving a data voltage VDATA, and a second electrode connected to the second pixel node PN2. The second pixel transistor PT2 may be turned on in response to the write gate signal GW to provide the data voltage VDATA to the second pixel node PN2.

The third pixel transistor PT3 may include a gate electrode receiving a compensation gate signal GC, a first electrode connected to the third pixel node PN3, and a second electrode connected to the first pixel node PN1. The third pixel transistor PT3 may be turned on in response to the compensation gate signal GC to diode-connect the first pixel transistor PT1.

The fourth pixel transistor PT4 may include a gate electrode receiving an initialization gate signal GI, a first electrode receiving an initialization voltage VINT, and a second electrode connected to the first pixel node PN1. The fourth pixel transistor PT4 may be turned on in response to the initialization gate signal GI to provide the initialization voltage VINT to the first pixel node PN1.

The fifth pixel transistor PT5 may include a gate electrode receiving an emission signal EM, a first electrode receiving a first power supply voltage ELVDD, and a second electrode connected to the second pixel node PN2. The sixth pixel transistor PT6 may include a gate electrode receiving the emission signal EM, a first electrode connected to the third pixel node PN3, and a second electrode connected to a fourth pixel node PN4. The fifth pixel transistor PT5 and the sixth pixel transistor PT6 may be turned on in response to the emission signal EM to control a light emission of the light emitting element EL.

The seventh pixel transistor PT7 may include a gate electrode receiving a bias gate signal GB, a first electrode receiving an anode initialization voltage VAINT, and a second electrode connected to the fourth pixel node PN4. The seventh pixel transistor PT7 may provide the anode initialization voltage VAINT to the fourth pixel node PN4 in response to the bias gate signal GB.

The eighth pixel transistor PT8 may include a gate electrode receiving the bias gate signal GB, a first electrode receiving a bias voltage VOBS, and a second electrode connected to the second pixel node PN2. The eighth pixel transistor PT8 may be turned on in response to the bias gate signal GB to provide the bias voltage VOBS to the second pixel node PN2.

The storage capacitor CST may include a first electrode receiving the first power supply voltage ELVDD and a second electrode connected to the first pixel node PN1. The storage capacitor CST may store the data voltage VDATA.

The light emitting element EL may include an anode connected to the fourth pixel node PN4 and a cathode receiving a second power supply voltage ELVSS. The light emitting element EL may emit light based on the driving current. Since an intensity of the driving current is determined based on a level of the data voltage VDATA, a light emitting intensity of the light emitting element EL may be determined based on the level of the data voltage VDATA.

In an embodiment, the first, second, and fifth to eighth pixel transistors PT1, PT2, PT5 to PT8 may be P-type transistors, and the third and fourth pixel transistors PT3, PT4 may be N-type transistors. For example, the P-type transistor may be a PMOS (P-type Metal Oxide Semiconductor) transistor. For example, the N-type transistor may be an NMOS (N-type Metal Oxide Semiconductor) transistor. However, the present inventive concept is not limited thereto. When a signal applied to a gate electrode of the P-type transistor has the low level, the P-type transistor may be turned on. That is, an activation level of the P-type transistor may be the low level. When a signal applied to the gate electrode of the N-type transistor has a high level, the N-type transistor may be turned on. That is, an activation level of the N-type transistor may be the high level.

In addition, although the pixel in FIG. 2 is shown as including eight transistors PT1 to PT8 and one capacitor CST, the present inventive concept is not limited thereto.

Figure 3:
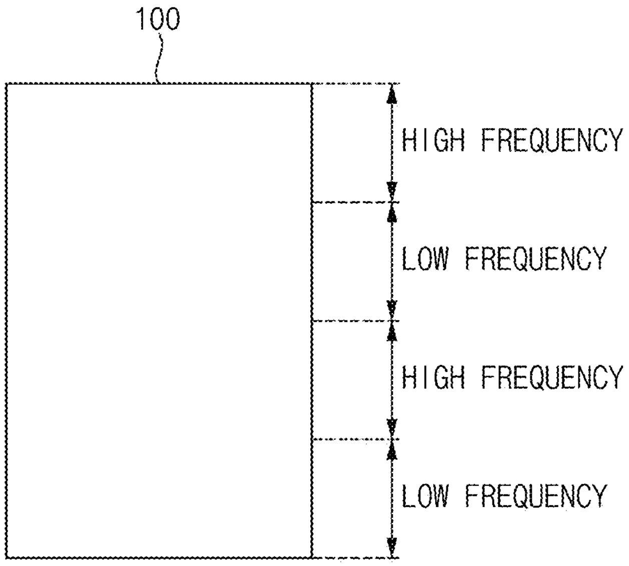
FIG. 3 is a conceptual diagram showing a driving frequency of each region of a display panel of FIG. 1.
Figure 4:
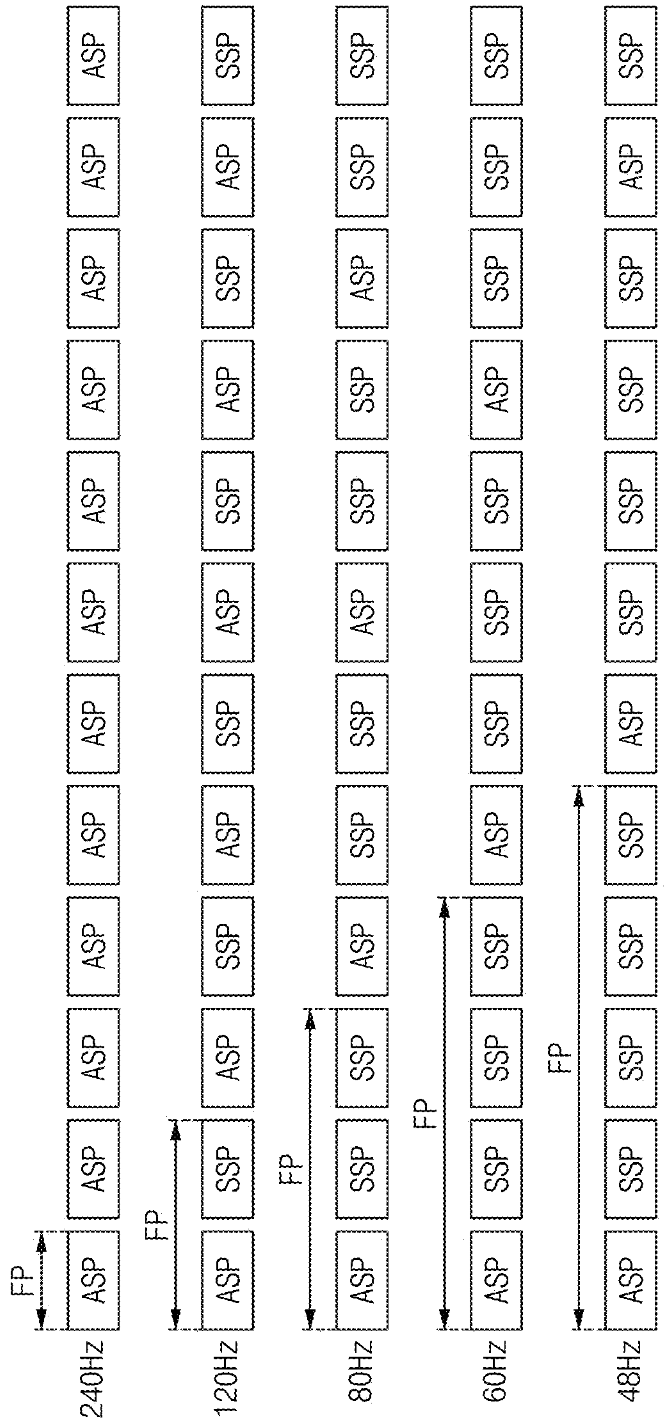
FIG. 4 is a conceptual diagram explaining a driving operation of a display device of FIG. 1.

FIG. 3 is a conceptual diagram showing a driving frequency of each region of a display panel 100 of FIG. 1. FIG. 4 is a conceptual diagram explaining a driving operation of a display device 10 of FIG. 1.

Referring to FIG. 1 and FIG. 4, the display device 10 may support MFD (Multi-Frequency Driving). For the display device 10 supporting MFD, a part of the display panel 100 may be driven at a high frequency, and another part of the display panel 100 may be driven at a low frequency.

A frame period FP may include an address scan period ASP in which a data voltage VDATA is written to a pixel and the light is emitted, and a self-scan period SSP in which the data voltage VDATA is not written to the pixel and only the light is emitted.

When a driving frequency of the display panel 100 is a maximum driving frequency (e.g., 240 Hz), the frame period FP may include only the address scan period ASP. When the driving frequency of the display panel 100 is driving frequencies other than the maximum driving frequency of the display panel 100 (i.e., 120 Hz, 80 Hz, 60 Hz, 48 Hz), the frame period FP may include the address scan period ASP and the self-scan period SSP following the address scan period ASP.

The number of the self-scan periods SSP included in the frame period FP may vary depending on the driving frequency of the display panel 100. For example, when the driving frequency of the display panel 100 is 240 Hz, the frame period FP may include one address scan period ASP. For example, when the driving frequency of the display panel 100 is 120 Hz, the frame period FP may include one address scan period ASP and one self-scan period SSP. For example, when the driving frequency of the display panel 100 is 80 Hz, the frame period FP may include one address scan period ASP and two self-scan periods SSP. For example, when the driving frequency of the display panel 100 is 60 Hz, the frame period FP may include one address scan period ASP and three self-scan periods SSP. For example, when the driving frequency of the display panel 100 is 48 Hz, the frame period FP may include one address scan period ASP and four self-scan periods SSP.

Figure 5:
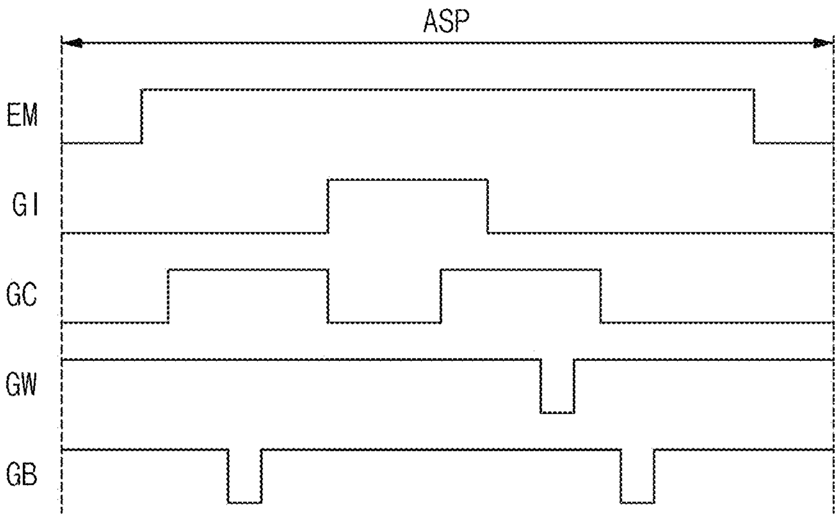
FIG. 5 is a timing diagram showing signals applied to a pixel of FIG. 2 in an address scan period of FIG. 4.

FIG. 5 is a timing diagram showing signals GW, GC, GI, GB, EM applied to a pixel of FIG. 2 in an address scan period ASP of FIG. 4.

Referring to FIGS. 1 to 5, in the address scan period ASP, each of a write gate signal GW, a compensation gate signal GC, an initialization gate signal GI, a bias gate signal GB, and an emission signal EM may have at least one activation pulse. For example, each of the write gate signal GW, the initialization gate signal GI, and the emission signal EM may have one activation pulse. For example, each of the compensation gate signal GC and the bias gate signal GB may have two activation pulses.

Each of the write gate signal GW, the bias gate signal GB, and the emission signal EM may have a low pulse as the activation pulse. Here, the low pulse may have a low level as an activation level. For example, the compensation gate signal GC and the initialization gate signal GI may have a high pulse as the activation pulse. Here, the high pulse may have a high level as the activation level.

The duration in which the emission signal EM has a deactivation level (i.e., the high level) may include the activation pulse of the write gate signal GW, the activation pulses of the compensation gate signal GC, the activation pulses of the initialization gate signal GI, and the activation pulse of the bias gate signal GB.

Figure 6:
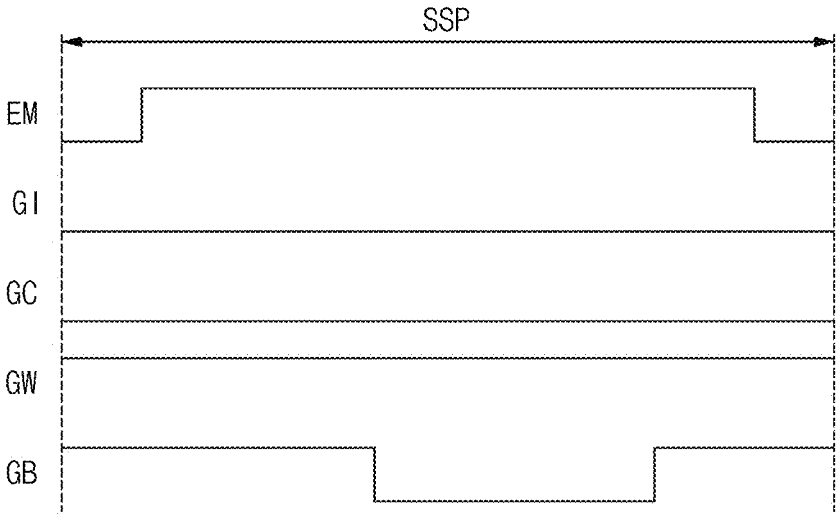
FIG. 6 is a timing diagram showing signals applied to a pixel of FIG. 2 in a self-scan period of FIG. 4.

FIG. 6 is a timing diagram showing signals GW, GC, GI, GB, EM applied to a pixel of FIG. 2 in a self-scan period SSP of FIG. 4.

Referring to FIGS. 1 to 6, in the self-scan period SSP, each of the bias gate signal GB and the emission signal EM may have at least one activation pulse. For example, each of the bias gate signal GB and the emission signal EM may have one activation pulse. Each of the bias gate signal GB and the emission signal EM may have the low pulse as the activation pulse. Here, the low pulse may have the low level as the activation level.

The period in which the emission signal EM has the deactivation level (i.e., the high level) may include the activation pulse of the bias gate signal GB.

On the other hand, each of the write gate signal GW, the compensation gate signal GC, and the initialization gate signal GI may not have the activation pulse. That is, each of the write gate signal GW, the compensation gate signal GC, and the initialization gate signal GI may have only the deactivation level. For example, each of the write gate signal GW, the compensation gate signal GC, and the initialization gate signal GI may be masked to have only the deactivation level.

Figure 7:
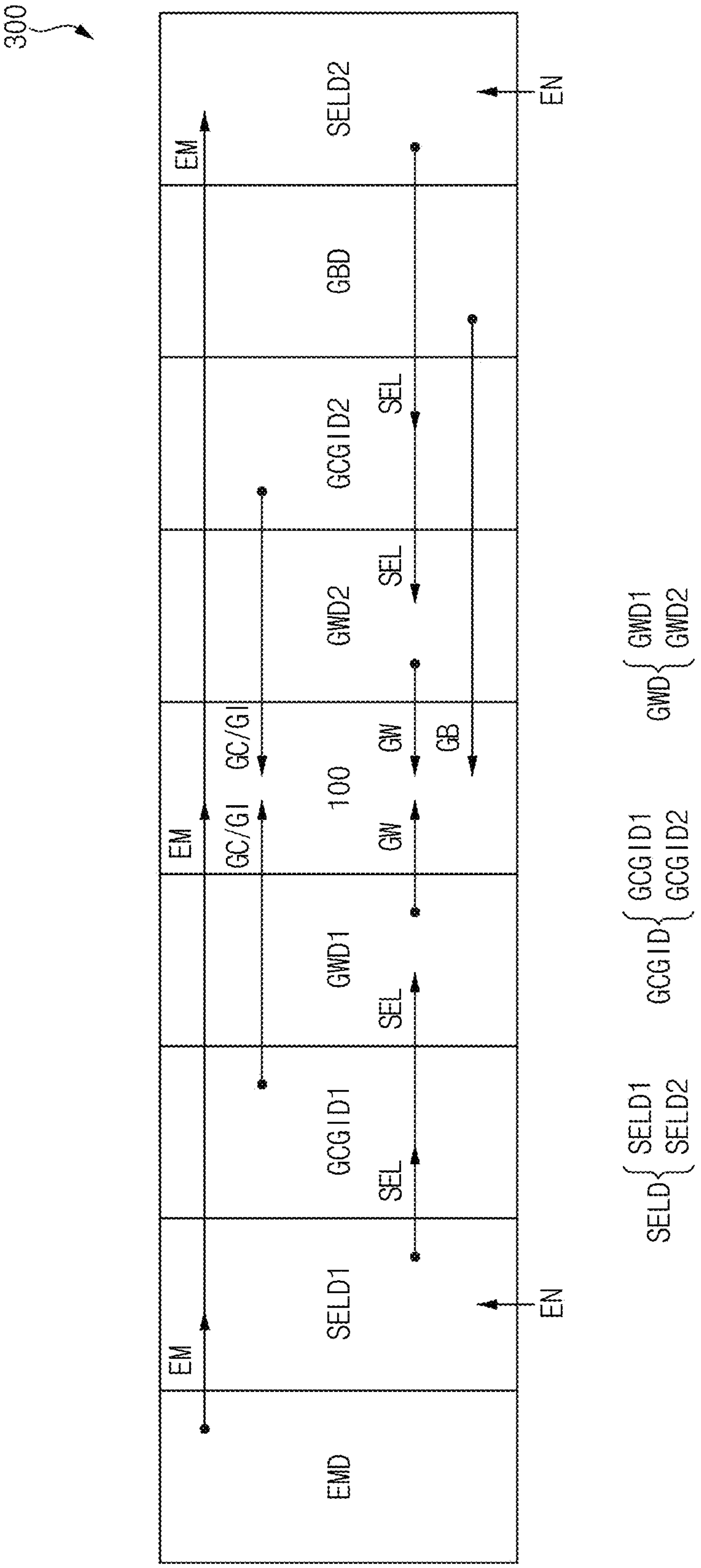
FIG. 7 is a block diagram showing an example of an emission selection gate driver of FIG. 1.

FIG. 7 is a block diagram showing an example of an emission selection gate driver 300 of FIG. 1.

Referring to FIGS. 1 to 7, the emission selection gate driver 300 may include a plurality of drivers.

For example, the drivers may include an emission driver EMD, a selection driver SELD, a compensation initialization gate driver GCGID, a write gate driver GWD, and a bias gate driver GBD. For example, the selection driver SELD may include a first selection driver SELD1 and a second selection driver SELD2, the compensation initialization gate driver GCGID may include a first compensation initialization gate driver GCGID1 and a second compensation initialization gate driver GCGID2, and the write gate driver GWD may include a first write gate driver GWD1 and a second write gate driver GWD2.

A part of the drivers of the emission selection gate driver 300 may be disposed on a first side of the display panel 100, and some of the drivers of the emission selection gate driver 300 may be disposed on a second side of the display panel 100.

For example, the emission driver EMD, the first selection driver SELD1, the first compensation initialization gate driver GCGI1, and the first write gate driver GWD1 may be disposed on the first side of the display panel 100. For example, the second selection driver SELD2, the bias gate driver GBD, the second compensation initialization gate driver GCGI2, and the second write gate driver GWD2 may be disposed on the second side of the display panel 100.

The emission driver EMD may generate the emission signal EM and provide the emission signal EM to the first selection driver SELD1, the pixels of the display panel 100, and the second selection driver SELD2.

The first selection driver SELD1 may generate a selection signal SEL based on the emission signal EM and an enable signal EN, and may provide the selection signal SEL to the first compensation initialization gate driver GCGID1 and the first write gate driver GWD1.

The first compensation initialization gate driver GCGID1 may generate the compensation gate signal GC and the initialization gate signal GI, and may provide the compensation gate signal GC and the initialization gate signal GI to the pixels of the display panel 100. However, the compensation gate signal GC and the initialization gate signal GI may be masked based on the selection signal SEL.

The first write gate driver GWD1 may generate the write gate signal GW and provide the write gate signal GW to the pixels of the display panel 100. However, the write gate signal GW may be masked based on the selection signal SEL.

The second selection driver SELD2 may generate the selection signal SEL based on the emission signal EM and the enable signal EN, and provide the selection signal SEL to the second compensation initialization gate driver GCGID2 and the second write gate driver GWD2.

The bias gate driver GBD may generate the bias gate signal GB and provide the bias gate signal GB to the pixels of the display panel 100.

The second compensation initialization gate driver GCGID2 may generate the compensation gate signal GC and the initialization gate signal GI, and may provide the compensation gate signal GC and the initialization gate signal GI to the pixels of the display panel 100. However, the compensation gate signal GC and the initialization gate signal GI may be masked based on the selection signal SEL.

The second write gate driver GWD2 may generate the write gate signal GW, and may provide the write gate signal GW to the pixels of the display panel 100. However, the write gate signal GW may be masked based on the selection signal SEL.

Here, the enable signal EN may be a global scan signal, and each of the write gate signal GW, the compensation gate signal GC, the initialization gate signal GI, the bias gate signal GB, the emission signal EM, and the selection signal SEL may be a progressive scan signal.

Figure 8:
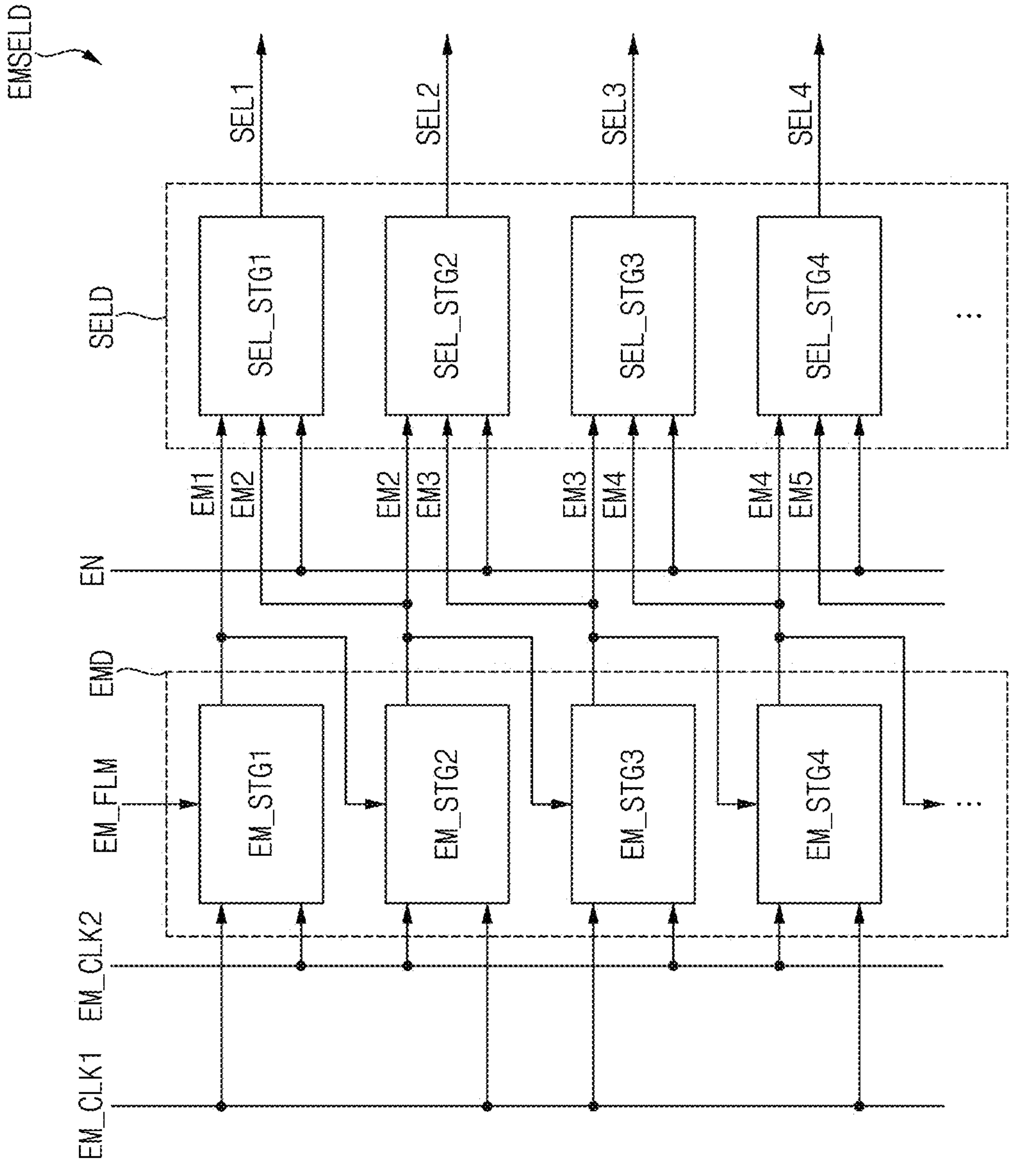
FIG. 8 is a block diagram showing an emission selection driver including an emission driver and a selection driver of FIG. 7.

FIG. 8 is a block diagram showing an emission selection driver EMSELD including an emission driver EMD and a selection driver SELD of FIG. 7.

Referring to FIGS. 1 to 8, the emission selection driver EMSELD may include the emission driver EMD and the selection driver SELD. The emission driver EMD may include a plurality of emission stages EM_STG1, EM_STG2, EM_STG3, EM_STG4, . . . , and the selection driver SELD may include a plurality of selection stages SEL_STG1, SEL_STG2, SEL_STG3, SEL_STG4, . . . .

The emission stages EM_STG1, EM_STG2, EM_STG3, EM_STG4, . . . may receive an emission start signal EM_FLM, a first emission clock signal EM_CLK1, and a second emission clock signal EM_CLK2.

Each of the emission stages EM_STG1, EM_STG2, EM_STG3, EM_STG4, . . . may alternately receive the first emission clock signal EM_CLK1 and the second emission clock signal EM_CLK2. For example, a first clock terminal of a first emission stage EM_STG1 may receive the first emission clock signal EM_CLK1, and a second clock terminal of the first emission stage EM_STG1 may receive the second emission clock signal EM_CLK2. For example, a first clock terminal of a second emission stage EM_STG2 may receive the second emission clock signal EM_CLK2, and a second clock terminal of the second emission stage EM_STG2 may receive the first emission clock signal EM_CLK1. For example, a first clock terminal of a third emission stage EM_STG3 may receive the first emission clock signal EM_CLK1, and a second clock terminal of the third emission stage EM_STG3 may receive the second emission clock signal EM_CLK2. For example, a first clock terminal of a fourth emission stage EM_STG4 may receive the second emission clock signal EM_CLK2, and a second clock terminal of the fourth emission stage EM_STG4 may receive the first emission clock signal EM_CLK1.

The emission stages EM_STG1, EM_STG2, EM_STG3, EM_STG4, . . . may sequentially output emission signals EM1, EM2, EM3, EM4, . . . . For example, the first emission stage EM_STG1 may output a first emission signal EM1. For example, the second emission stage EM_STG2 may output a second emission signal EM2. For example, the third emission stage EM_STG3 may output a third emission signal EM3. For example, the fourth emission stage EM_STG4 may output a fourth emission signal EM4.

An input terminal of the first emission stage EM_STG1 may receive the emission start signal EM_FLM, and an input terminal of each of the subsequent emission stages EM_STG2, EM_STG3, EM_STG4, . . . may receive an emission signal of a previous emission stage. For example, an input terminal of the second emission stage EM_STG2 may receive the first emission signal EM1 of the first emission stage EM_STG1. For example, the third emission stage EM_STG3 may receive the second emission signal EM2 of the second emission stage EM_STG2. For example, the fourth emission stage EM_STG4 may receive the third emission signal EM3 of the third emission stage EM_STG3.

Each of the selection stages SEL_STG1, SEL_STG2, SEL_STG3, SEL_STG4, . . . may receive an emission signal, a next emission signal, and an enable signal EN. For example, the first selection stage SEL_STG1 may receive the first emission signal EM1 as the emission signal, the second emission signal EM2 as the next emission signal, and the enable signal EN. For example, the second selection stage SEL_STG2 may receive the second emission signal EM2 as the emission signal, the third emission signal EM3 as the next emission signal, and the enable signal EN. For example, the third selection stage SEL_STG3 may receive the third emission signal EM3 as the emission signal, the fourth emission signal EM4 as the next emission signal, and the enable signal EN. For example, the fourth selection stage SEL_STG4 may receive the fourth emission signal EM4 as the emission signal, may receive the fifth emission signal EM5 as the next emission signal, and may receive the enable signal EN. Here, the fifth emission signal EM5 may be output from the fifth emission stage (not shown).

The selection stages SEL_STG1, SEL_STG2, SEL_STG3, SEL_STG4, . . . may sequentially output the selection signals SEL1, SEL2, SEL3, SEL4, . . . in units of the pixel rows. For example, the first selection stage SEL_STG1 may output a first selection signal SEL1. For example, the second selection stage SEL_STG2 may output a second selection signal SEL2. For example, the third selection stage SEL_STG3 may output a third selection signal SEL3. For example, the fourth selection stage SEL_STG4 may output a fourth selection signal SEL4.

Figure 9:
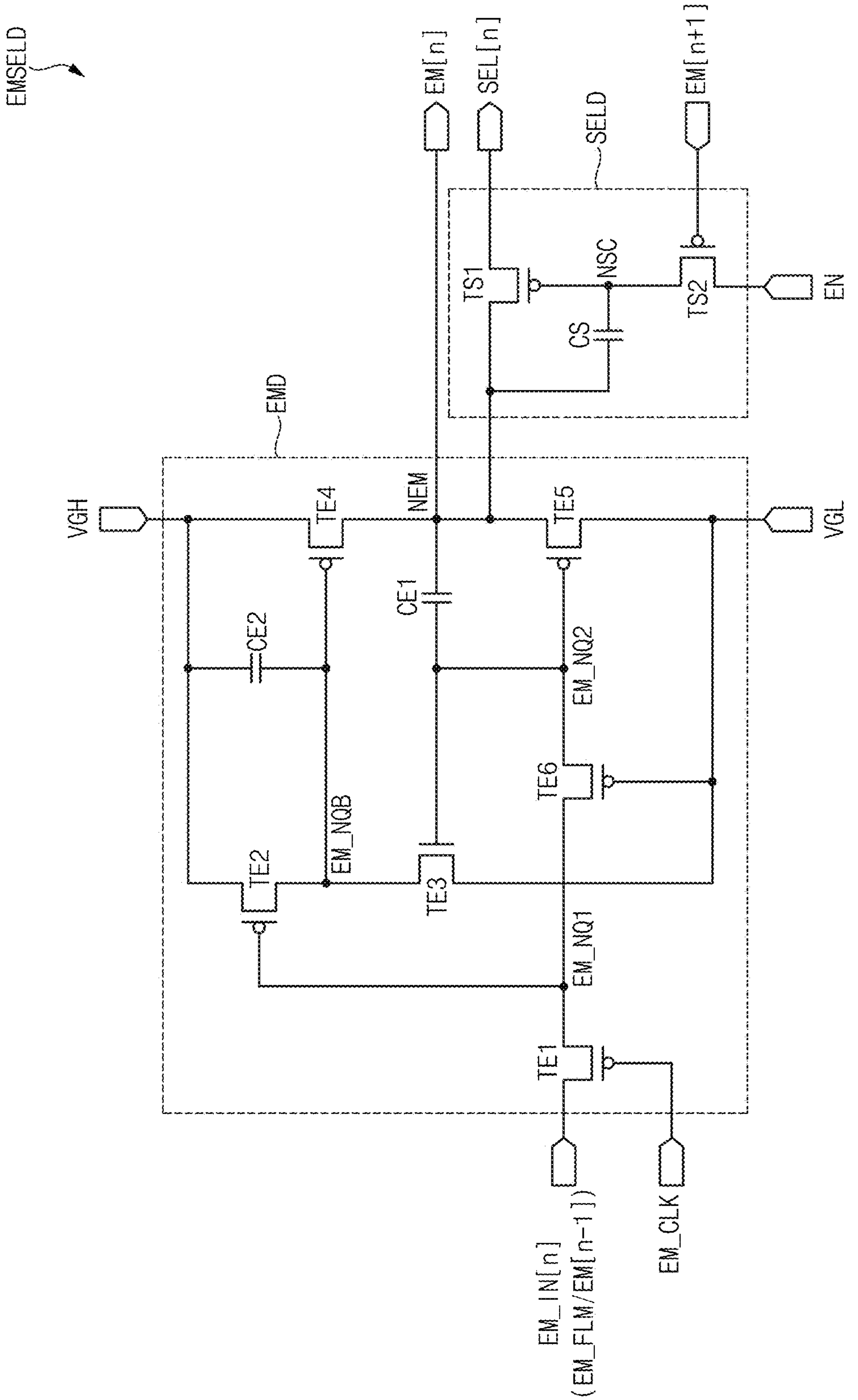
FIG. 9 is a circuit diagram showing an emission selection driver of FIG. 8.

FIG. 9 is a circuit diagram showing an emission selection driver EMSELD of FIG. 8.

Referring to FIGS. 1 to 9, the emission selection driver EMSELD may include an emission driver EMD and a selection driver SELD. The emission driver EMD may include a plurality of emission stages EM_STG1, EM_STG2, EM_STG3, EM_STG4, . . . , and the selection driver SELD may include a plurality of selection stages SEL_STG1, SEL_STG2, SEL_STG3, SEL_STG4, . . . . FIG. 9 shows an n-th emission stage and an n-th selection stage. Here, n is a positive integer greater than or equal to 1.

The emission driver EMD may include first to sixth emission transistors TE1 to TE6 and first to second emission capacitors CE1 to CE2.

The first emission transistor TE1 may include a gate electrode receiving an emission clock signal EM_CLK, a first electrode receiving an emission input signal EM_IN[n], and a second electrode connected to an emission control node EM_NQ1, EM_NQ2. The first emission transistor TE1 may be turned on in response to the emission clock signal EM_CLK to provide the input signal EM_IN[n] to the emission control node EM_NQ1, EM_NQ2. The emission input signal EM_IN[n] may be an emission start signal EM_FLM or a previous emission signal EM[n−1]. When n is 1, the emission input signal EM_IN[n] may be the emission start signal EM_FLM. When n is 2 or more, the emission input signal EM_IN[n] may be the previous emission signal EM[n−1]. As used herein, an element being "connected to an emission control node" is intended to mean that the element is connected to at least one of the emission control nodes EM_NQ1, EM_NQ2. Similarly, where there are multiple nodes referred to with one name, an element being "connected to" a node of that name is intended to mean that the element is connected to at least one of those nodes sharing the name.

The second emission transistor TE2 may include a gate electrode connected to the emission control node EM_NQ1, EM_NQ2, a first electrode receiving a high gate voltage VGH, and a second electrode connected to an inverted emission control node EM_NQB. The second emission transistor TE2 may be turned on in response to a voltage of the emission control node EM_NQ1, EM_NQ2 to provide the high gate voltage VGH to the inverted emission control node EM_NQB.

The third emission transistor TE3 may include a gate electrode connected to the emission control node EM_NQ1, EM_NQ2, a first electrode receiving a low gate voltage VGL, and a second electrode connected to the inverted emission control node EM_NQB. The third emission transistor TE3 may be turned on in response to the voltage of the emission control node EM_NQ1, EM_NQ2 to provide the low gate voltage VGL to the inverted emission control node EM_NQB.

The fourth emission transistor TE4 may include a gate electrode connected to the inverted emission control node EM_NQB, a first electrode receiving the high gate voltage VGH, and a second electrode connected to an emission output node NEM outputting an emission signal EM[n]. The fourth emission transistor TE4 may be turned on in response to a voltage of the inverted emission control node EM_NQB to provide the high gate voltage VGH to the emission output node NEM.

The fifth emission transistor TE5 may include a gate electrode connected to the emission control node EM_NQ1, EM_NQ2, a first electrode receiving the low gate voltage VGL, and a second electrode connected to the emission output node NEM. The fifth emission transistor TE5 may be turned on in response to the voltage of the emission control node EM_NQ1, EM_NQ2 to provide the low gate voltage VGL to the emission output node NEM.

The emission control node EM_NQ1, EM_NQ2 may include a first emission control node EM_NQ1 and a second emission control node EM_NQ2.

The sixth emission transistor TE6 may include a gate electrode receiving the low gate voltage VGL, a first electrode connected to the first emission control node EM_NQ1, and a second electrode connected to the second emission control node EM_NQ2. The sixth emission transistor TE6 may be always turned on in response to the low gate voltage VGL. Therefore, the sixth emission transistor TE6 may be AOT (Always-On Transistor). The sixth emission transistor TE6 may control a voltage of the first emission control node EM_NQ1 and a voltage of the second emission control node EM_NQ2.

The first emission capacitor CE1 may include a first electrode connected to the second emission control node EM_NQ2 and a second electrode connected to the emission output node NEM.

The second emission capacitor CE2 may include a first electrode receiving the high gate voltage VGH and a second electrode connected to the inverted emission control node EM_NQB.

The first, second, and fourth to sixth emission transistors TE1, TE2, TE4 to TE6 may be P-type transistors. For example, the P-type transistor may be a PMOS transistor. The third emission transistor TE3 may be an N-type transistor. For example, the N-type transistor may be an NMOS transistor.

As such, the emission driver EMD may output the emission signal EM[n] based on the input signal EM_IN[n] and the emission clock signal EM_CLK. In FIG. 9, the emission driver EMD is shown as including six transistors TE1 to TE6 and two capacitors CE1 to CE2. However, the present inventive concept is not limited thereto. The emission driver GCGID may have any configuration which outputs the emission signal EM[n].

The selection driver SELD may include a first selection transistor TS1, a second selection transistor TS2, and a selection capacitor CS.

The first selection transistor TS1 may include a gate electrode connected to a selection control node NSC, a first electrode connected to an emission output node NEM receiving the emission signal EM[n], and a second electrode outputting a selection signal SEL[n]. The first selection transistor TS1 may be turned on in response to a voltage of the selection control node NSC to output the emission signal EM as the selection signal SEL[n].

The second selection transistor TS2 may include a gate electrode receiving a next emission signal EM[n+1], a first electrode receiving an enable signal EN, and a second electrode connected to the selection control node NSC. The second selection transistor TS2 may be turned on in response to the next emission signal EM[n+1] to provide the enable signal EN to the selection control node NSC.

The selection capacitor CS may include a first electrode connected to the emission output node NEM and a second electrode connected to the selection control node NSC.

The first selection transistor TS1 and the second selection transistor TS2 may be P-type transistors. For example, the P-type transistor may be a PMOS transistor.

When a signal applied to a gate electrode of the P-type transistor has a low level, the P-type transistor may be turned on. That is, an activation level of the P-type transistor may be the low level. When a signal applied to the gate electrode of the N-type transistor has a high level, the N-type transistor may be turned on. That is, the activation level of the N-type transistor may be the high level. In FIGS. 10 to 28, the low level may be referred to as a first level and the high level may be referred to as a second level.

As such, the selection driver SELD may output the emission signal EM[n] as the selection signal SEL[n] based on the next emission signal EM[n+1] and the enable signal EN. Specifically, the selection signal SEL[n] may be controlled according to the enable signal EN.

Figure 10:
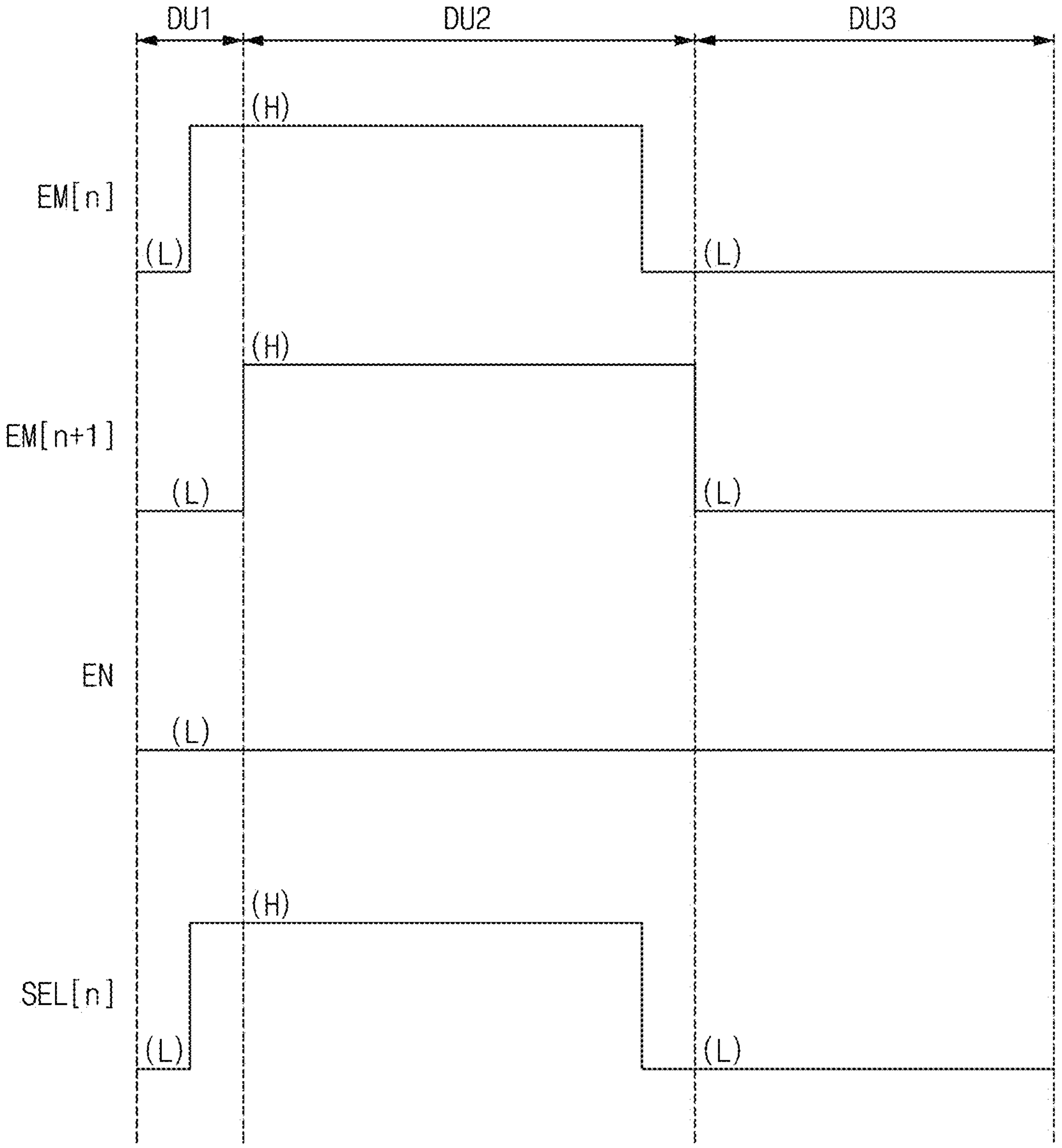
FIG. 10 is a timing diagram showing an output of a selection signal of FIG. 9 when an enable signal of FIG. 9 maintains a first level.
Figure 11:
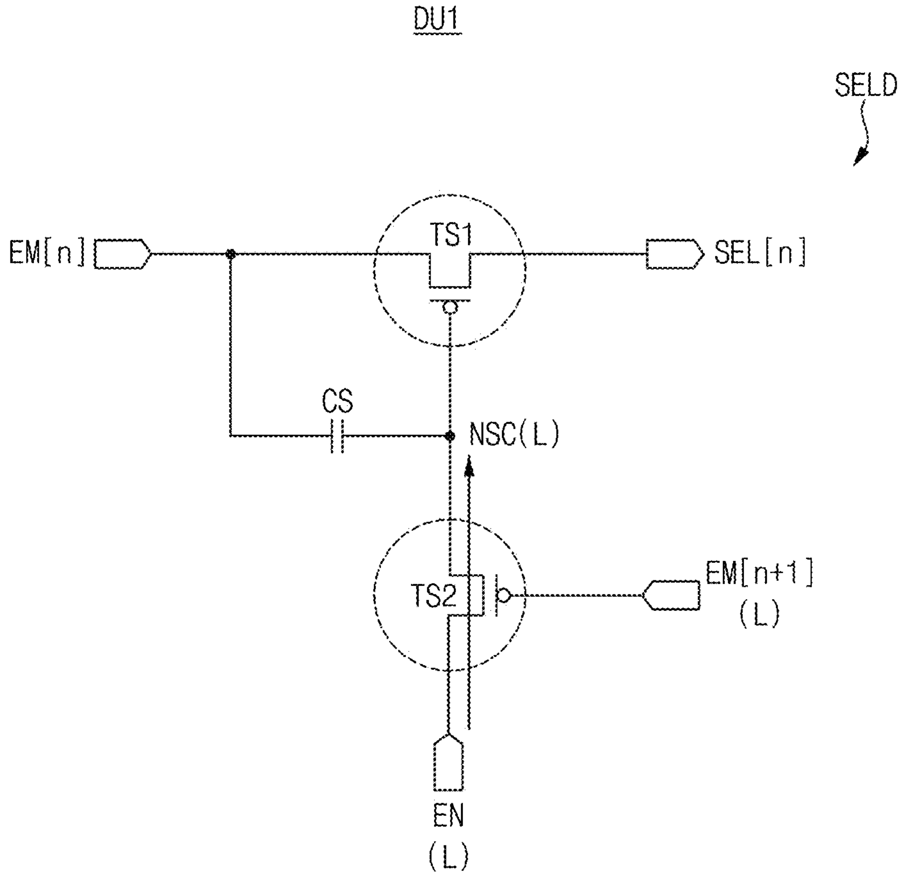
FIG. 11 is a circuit diagram showing an example of an operation of a selection driver of FIG. 9 in a first duration of FIG. 10.
Figure 12:
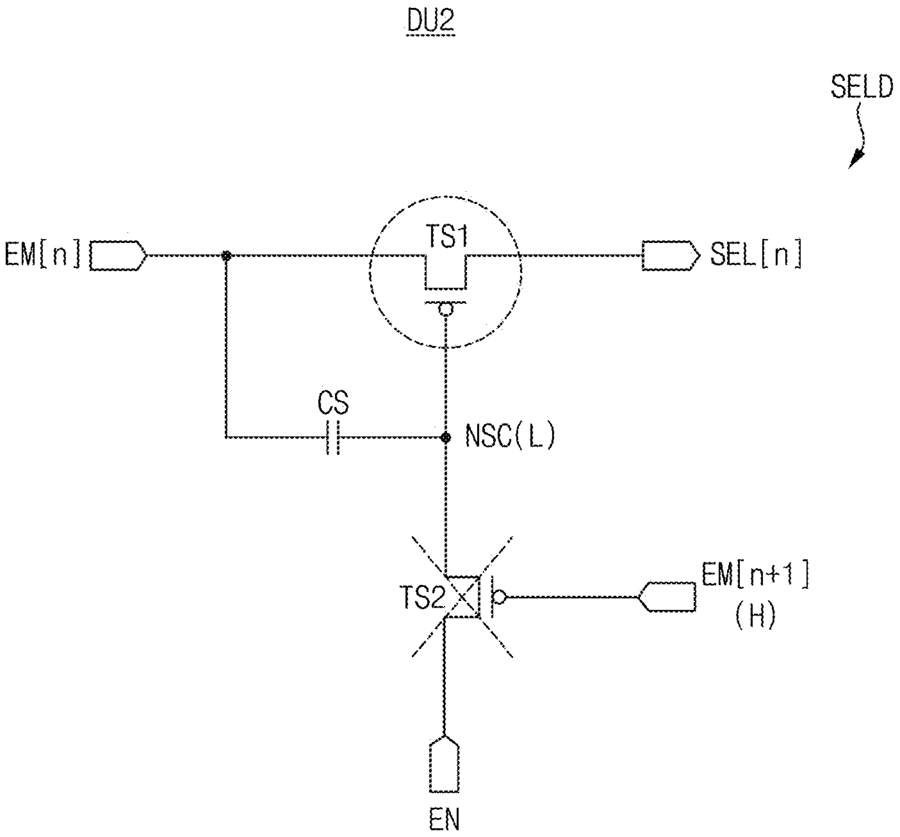
FIG. 12 is a circuit diagram showing an example of an operation of a selection driver of FIG. 9 in a second duration of FIG. 10.
Figure 13:
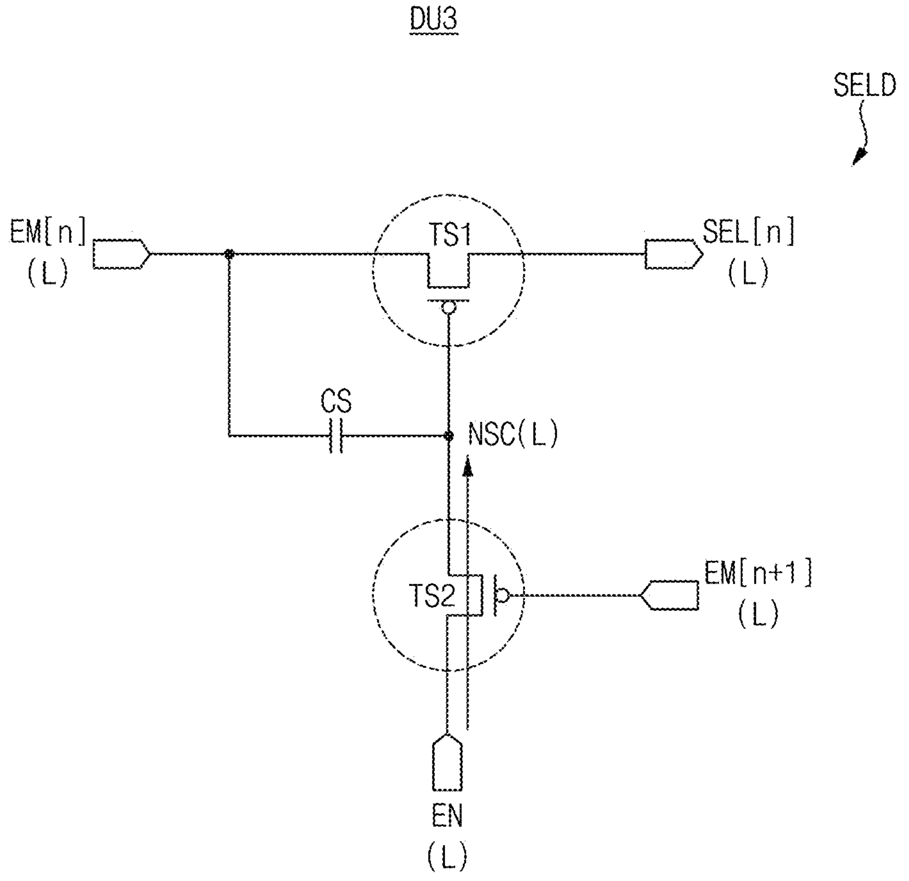
FIG. 13 is a circuit diagram showing an example of an operation of a selection driver of FIG. 9 in a third duration of FIG. 10.

FIG. 10 is a timing diagram showing an output of a selection signal SEL[n] of FIG. 9 when an enable signal EN of FIG. 9 maintains a first level L. FIG. 11 is a circuit diagram showing an example of an operation of a selection driver SELD of FIG. 9 in a first duration DU1 of FIG. 10. FIG. 12 is a circuit diagram showing an example of an operation of a selection driver SELD of FIG. 9 in a second duration DU2 of FIG. 10. FIG. 13 is a circuit diagram showing an example of an operation of a selection driver SELD of FIG. 9 in a third duration DU3 of FIG. 10. As used herein, pulses being "equal in timing" refers to different pulses rising and falling at the same time.

Referring to FIGS. 1 to 13, in the first duration DU1, the next emission signal EM[n+1] and the enable signal EN may have the first level L. When the next emission signal EM[n+1] and the enable signal EN have the first level L, the voltage level of the selection signal SEL[n] may be equal to that of the emission signal EM[n].

The second selection transistor TS2 may be turned on in response to the next emission signal EM[n+1] having the first level L to provide the enable signal EN having the first level L to the selection control node NSC. Therefore, the voltage of the selection control node NSC may have the first level L. The first selection transistor TS1 may be turned on in response to the voltage of the selection control node NSC having the first level L to output the emission signal EM[n] having the first level L as the selection signal SEL[n]. Therefore, the selection signal SEL[n] may be equal to the emission signal EM[n].

In the second duration DU2, the next emission signal EM[n+1] may have the second level H. When the next emission signal EM[n+1] has the second level H, the voltage of the selection control node NSC may maintain a previous state. When the previous state of the voltage of the selection control node SC is the first level L, the selection signal SEL[n] may be equal to the emission signal EM[n].

The second selection transistor TS2 may be turned off in response to the next emission signal EM[n+1] having the second level H. Since the previous state of the voltage of the selection control node NSC is the first level L, the first selection transistor TS1 may be turned on in response to the voltage of the selection control node NSC having the first level L to output the emission signal EM[n] as the selection signal SEL[n]. Therefore, the selection signal SEL[n] may be equal to the emission signal EM[n].

In the third duration DU3, the next emission signal EM[n+1] and the enable signal EN may have the first level L. As described in the first duration DU1, when the next emission signal EM[n+1] and the enable signal EN have the first level L, the selection signal SEL[n] may be equal to the emission signal EM[n].

As described in FIGS. 10 to 13, when the enable signal EN maintains the first level L, the selection signal SEL[n] may be equal to the emission signal EM[n].

Figure 14:
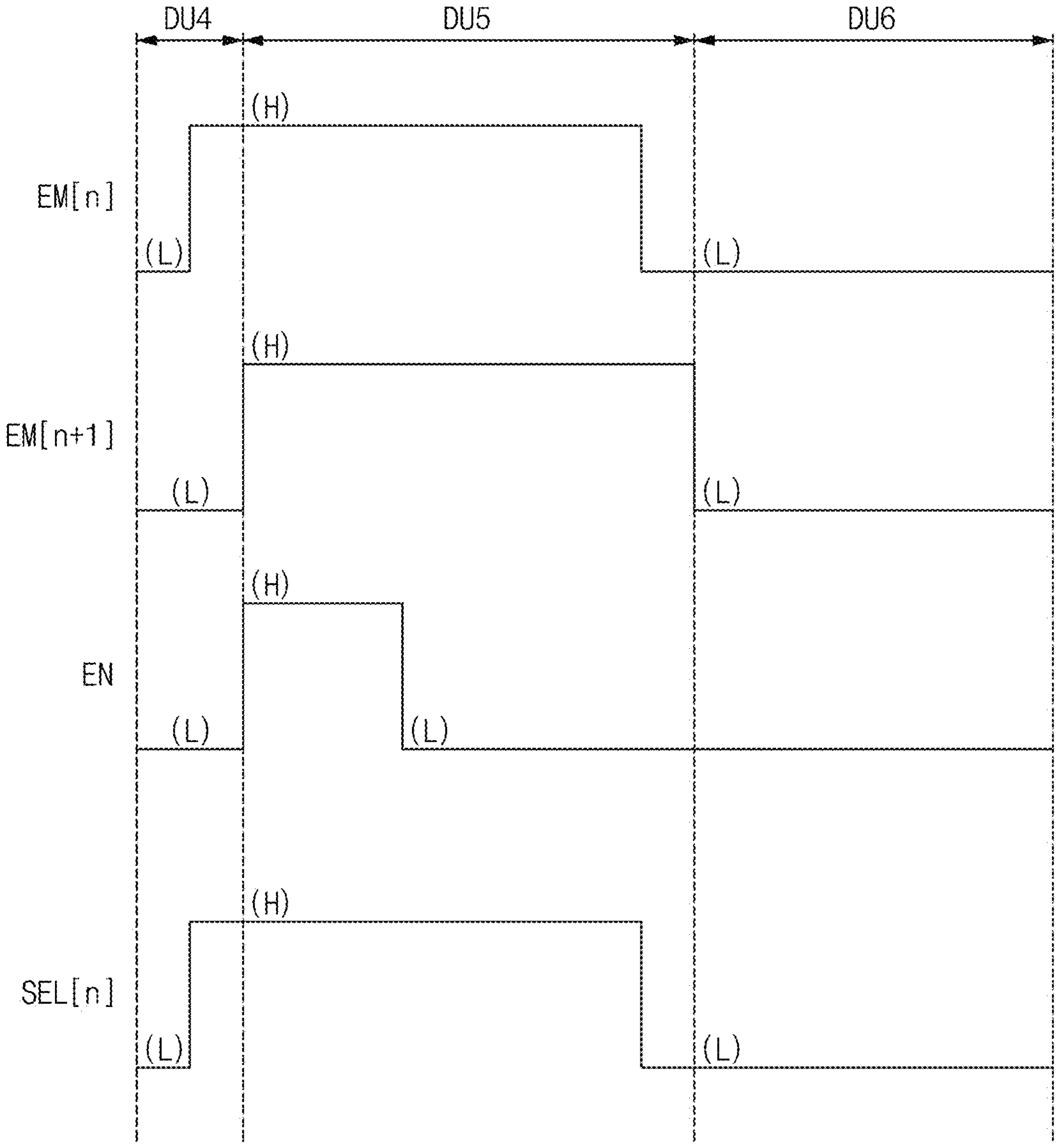
FIG. 14 is a timing diagram showing an output of a selection signal of FIG. 9 when a pulse of an enable signal of FIG. 9 is at a first position.
Figure 15:
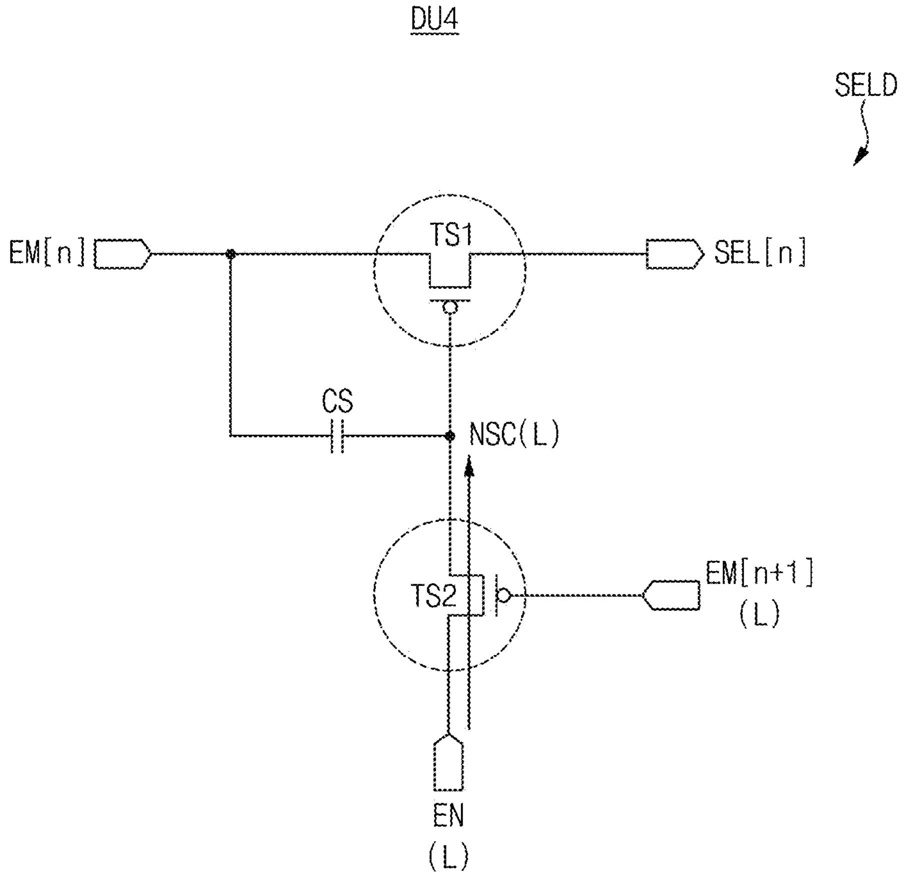
FIG. 15 is a circuit diagram showing an example of an operation of a selection driver of FIG. 9 in a fourth duration of FIG. 14.
Figure 16:
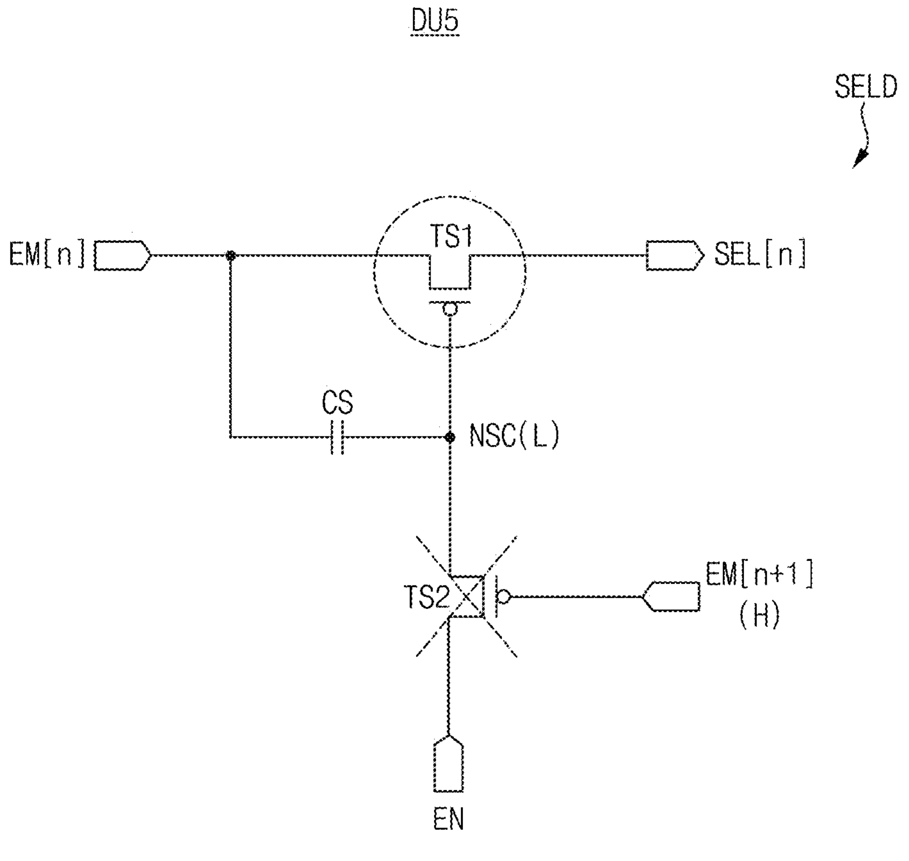
FIG. 16 is a circuit diagram showing an example of an operation of a selection driver of FIG. 9 in a fifth duration of FIG. 14.
Figure 17:
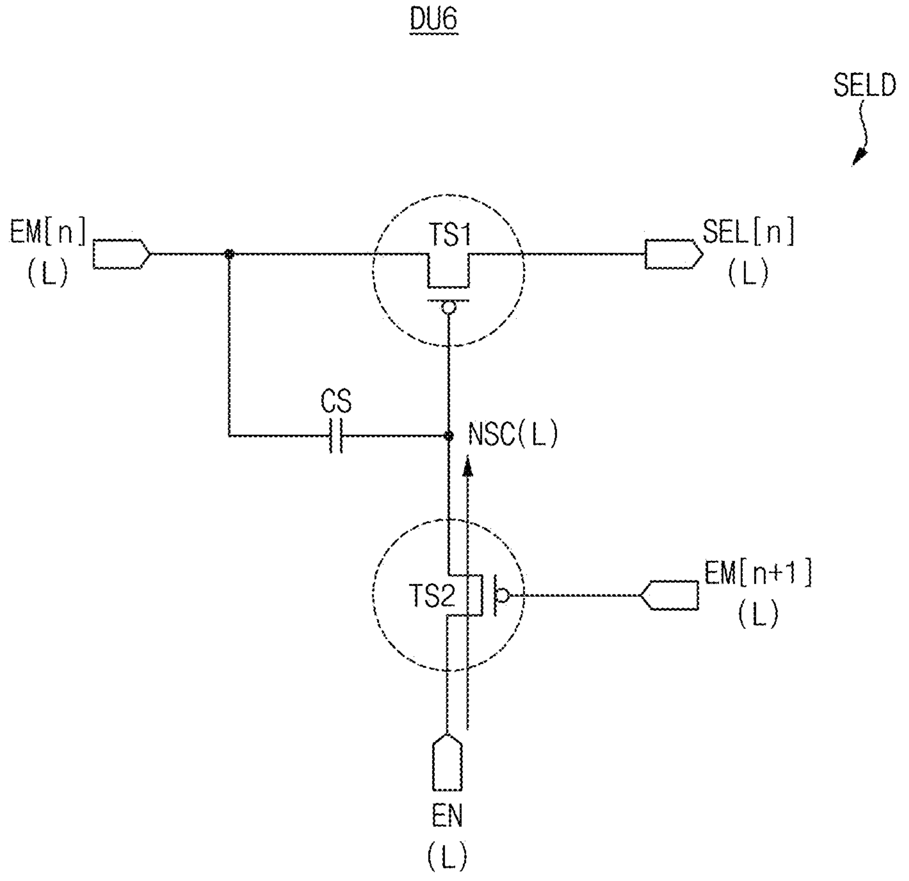
FIG. 17 is a circuit diagram showing an example of an operation of a selection driver of FIG. 9 in a sixth duration of FIG. 14.

FIG. 14 is a timing diagram showing an output of a selection signal SEL[n] of FIG. 9 when a pulse of an enable signal EN of FIG. 9 is at a first position. FIG. 15 is a circuit diagram showing an example of an operation of a selection driver SELD of FIG. 9 in a fourth duration DU4 of FIG. 14. FIG. 16 is a circuit diagram showing an example of an operation of a selection driver SELD of FIG. 9 in a fifth duration DU5 of FIG. 14. FIG. 17 is a circuit diagram showing an example of an operation of a selection driver SELD of FIG. 9 in a sixth duration DU6 of FIG. 14.

Referring to FIGS. 1 to 16, in the fourth duration DU4, the next emission signal EM[n+1] and the enable signal EN may have the first level L. As described in the first duration DU1, when the next emission signal EM[n+1] and the enable signal EN have the first level L, the selection signal SEL[n] may be equal to the emission signal EM[n].

In the fifth duration DU5, the next emission signal EM[n+1] may have the second level H, and the previous state of the voltage of the selection control node SC may be the first level L. As described in the second duration DU2, if the next emission signal EM[n+1] has the second level H and when the previous state of the voltage of the selection control node SC is the first level L, the selection signal SEL[n] may be equal to the emission signal EM[n].

In the sixth duration DU6, the next emission signal EM[n+1] and the enable signal EN may have the first level L. As described in the first duration DU1, when the next emission signal EM[n+1] and the enable signal EN has the first level L, the selection signal SEL[n] may be the same as the emission signal EM[n].

Figure 18:
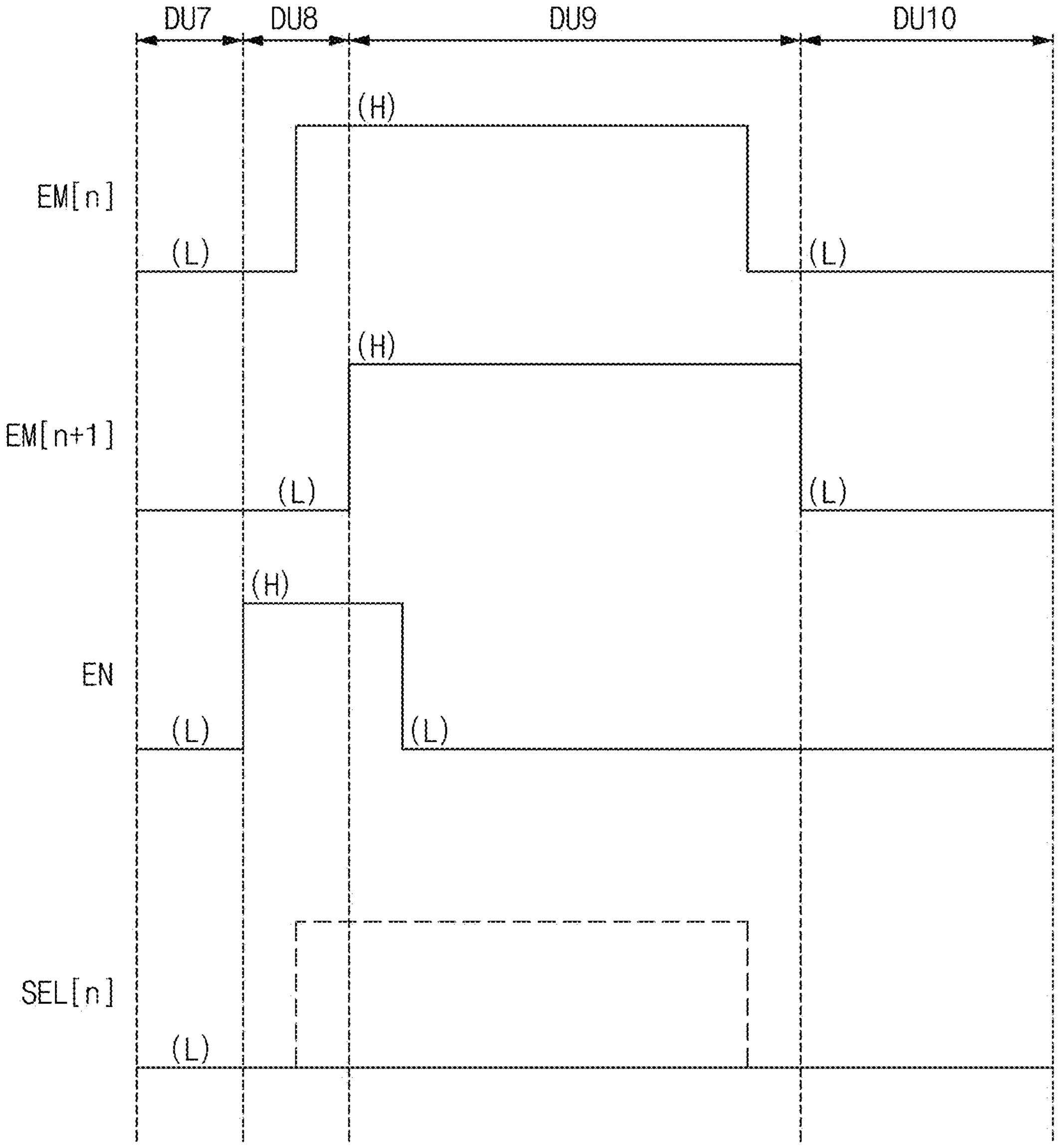
FIG. 18 is a timing diagram showing an output of a selection signal of FIG. 9 when a pulse of an enable signal of FIG. 9 is at a second position.
Figure 19:
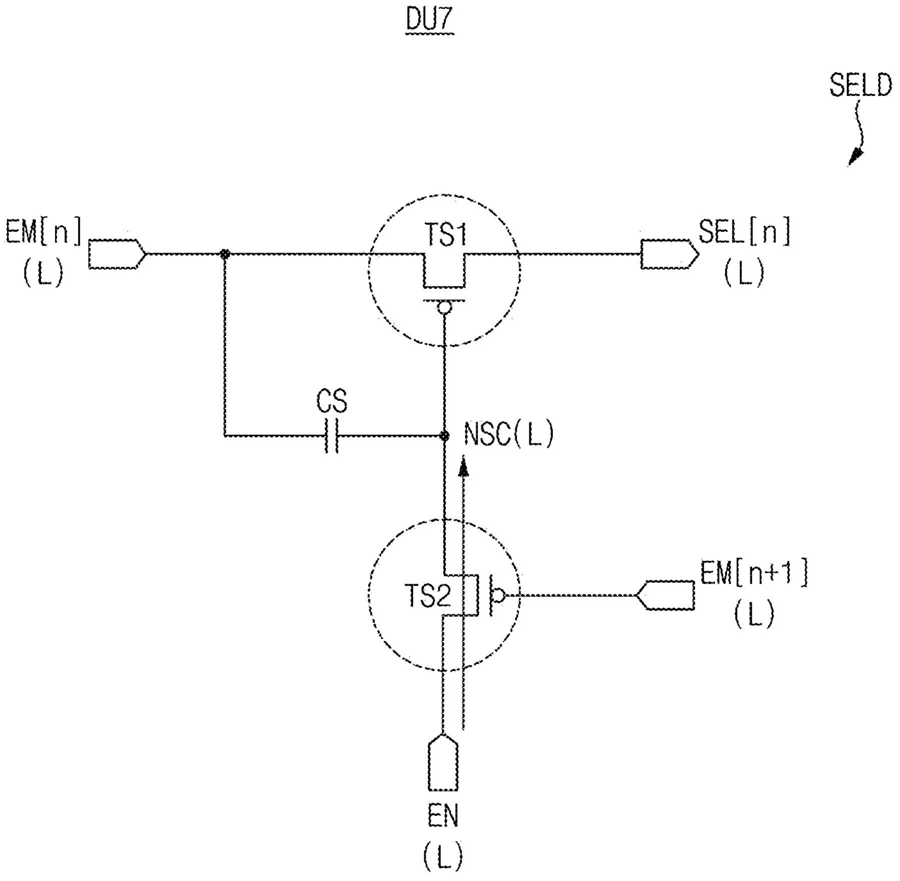
FIG. 19 is a circuit diagram showing an example of an operation of a selection driver of FIG. 9 in a seventh duration of FIG. 18.
Figure 20:
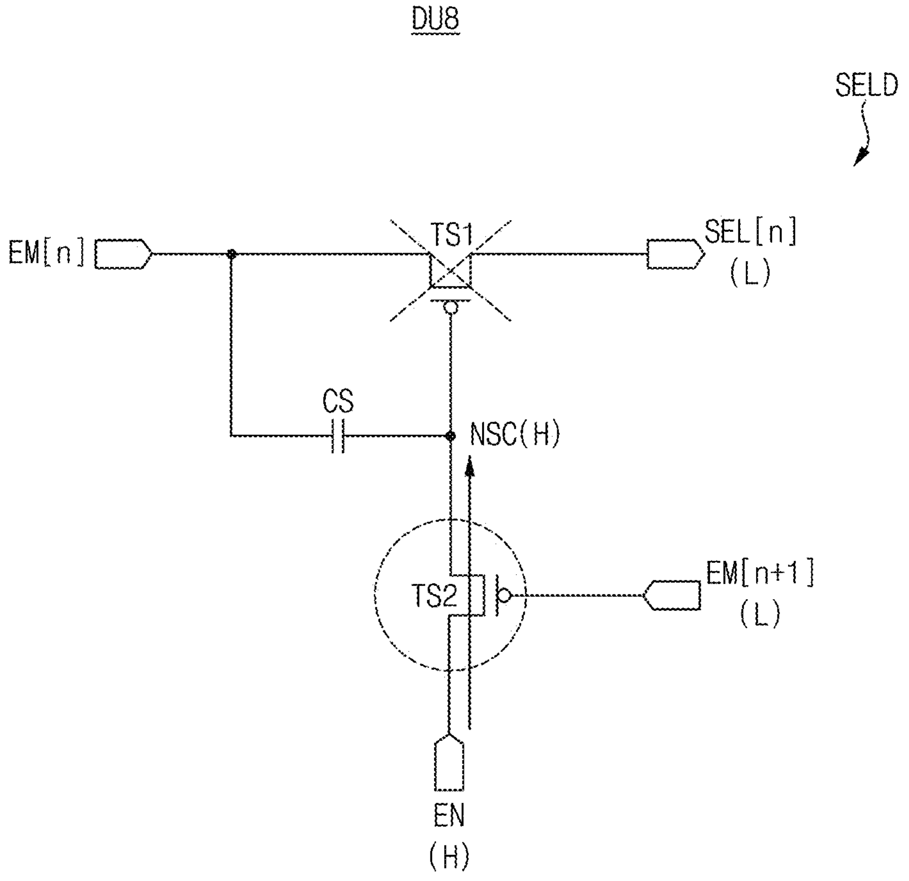
FIG. 20 is a circuit diagram showing an example of an operation of a selection driver of FIG. 9 in an eighth duration of FIG. 19.
Figure 21:
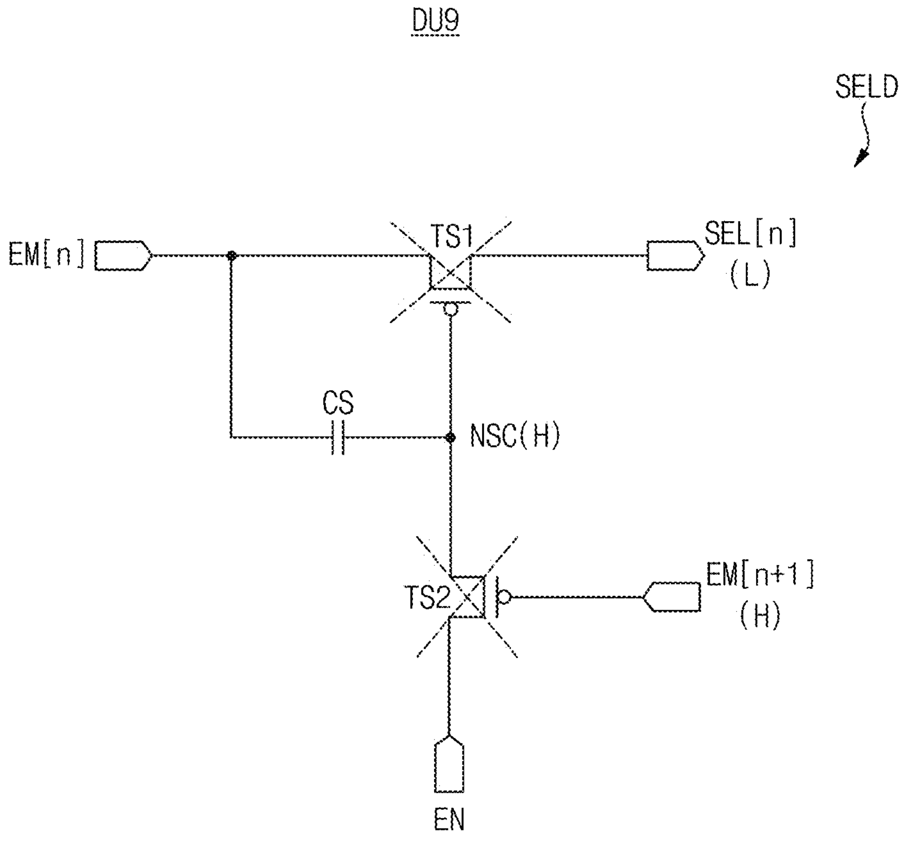
FIG. 21 is a circuit diagram showing an example of an operation of a selection driver of FIG. 9 in a ninth duration of FIG. 19.
Figure 22:
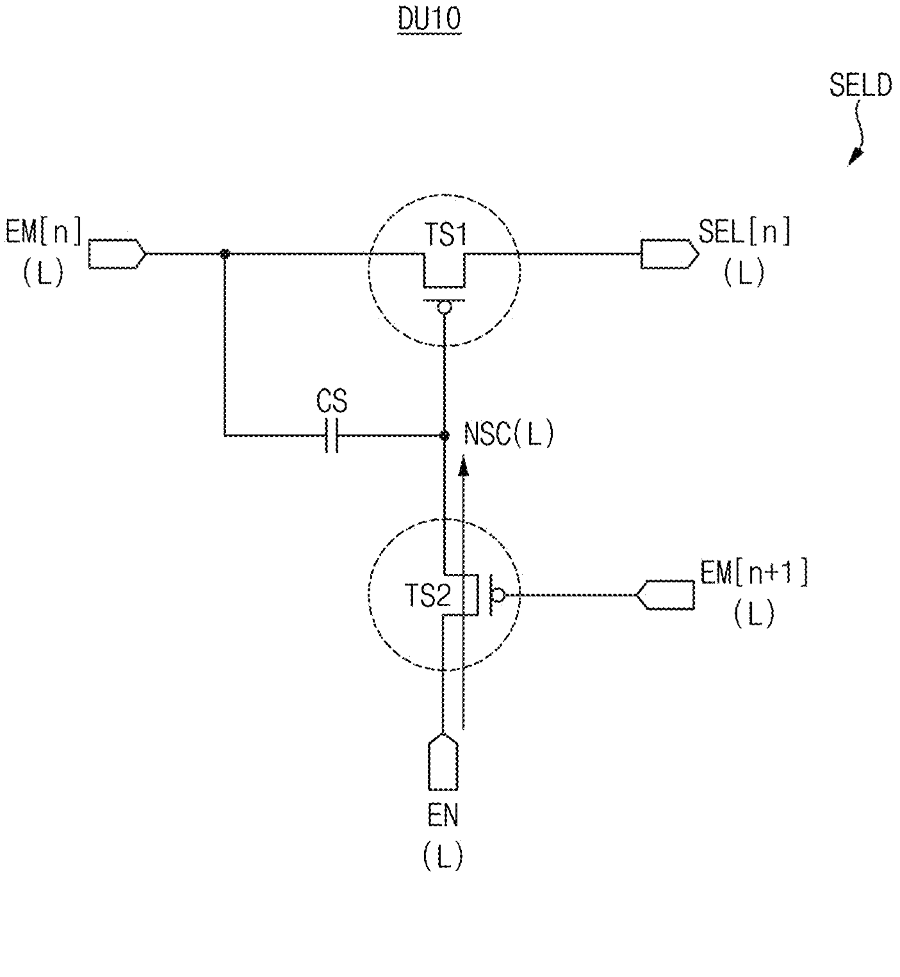
FIG. 22 is a circuit diagram showing an example of an operation of a selection driver of FIG. 9 in a ninth duration of FIG. 19.

FIG. 18 is a timing diagram showing an output of a selection signal SEL[n] of FIG. 9 when a pulse of the enable signal EN of FIG. 9 is at a second position. FIG. 19 is a circuit diagram showing an example of an operation of a selection driver SELD of FIG. 9 in a seventh duration DU7 of FIG. 18. FIG. 20 is a circuit diagram showing an example of an operation of a selection driver SELD of FIG. 9 in an eighth duration DU8 of FIG. 19. FIG. 21 is a circuit diagram showing an example of an operation of a selection driver SELD of FIG. 9 in a ninth duration DU9 of FIG. 19. FIG. 22 is a circuit diagram showing an example of an operation of a selection driver SELD of FIG. 9 in a ninth duration DU9 of FIG. 19.

Referring to FIGS. 1 to 22, in the seventh duration DU7, the next emission signal EM[n+1] and the enable signal EN may have the first level L. As described in the first duration DU1, when the next emission signal EM[n+1] and the enable signal EN have the first level L, the selection signal SEL[n] may be equal to the emission signal EM[n].

In the eighth duration DU8, the next emission signal EM[n+1] may have the first level L and the enable signal EN may have the second level H. When the next emission signal EM[n+1] has the first level L and the enable signal EN has the second level H, the selection signal SEL[n] may maintain the previous state.

The second selection transistor TS2 may be turned on in response to the next emission signal EM[n+1] having the first level L to provide the enable signal EN having the second level H to the selection control node NSC. Therefore, the voltage of the selection control node NSC may have the second level H. The first selection transistor TS1 may be turned off in response to the voltage of the selection control node NSC having the second level H. Since the selection signal SEL[n] has the first level L before the eighth duration DU8, the selection signal SEL[n] may maintain the previous state which is the first level L.

In the ninth duration DU9, the next emission signal EM[n+1] may have the second level H. When the next emission signal EM[n+1] has the second level H, the voltage of the selection control node NSC may maintain the previous state. When the previous state of the voltage of the selection control node SC is the second level H, the selection signal SEL[n] may maintain the previous state.

The second selection transistor TS2 may be turned off in response to the next emission signal EM[n+1] having the second level H. Since the previous state of the voltage of the selection control node NSC is the second level H, the first selection transistor TS1 may be turned off in response to the voltage of the selection control node NSC having the second level H. Since the selection signal SEL[n] has the first level L before the ninth duration DU9, the selection signal SEL[n] may maintain the previous state, which is the first level L.

In the tenth duration DU10, the next emission signal EM[n+1] and the enable signal EN may have the first level L. As described in the first duration DU1, when the next emission signal EM[n+1] and the enable signal EN have the first level L, the selection signal SEL[n] may be equal to the emission signal EM[n].

Figure 23:
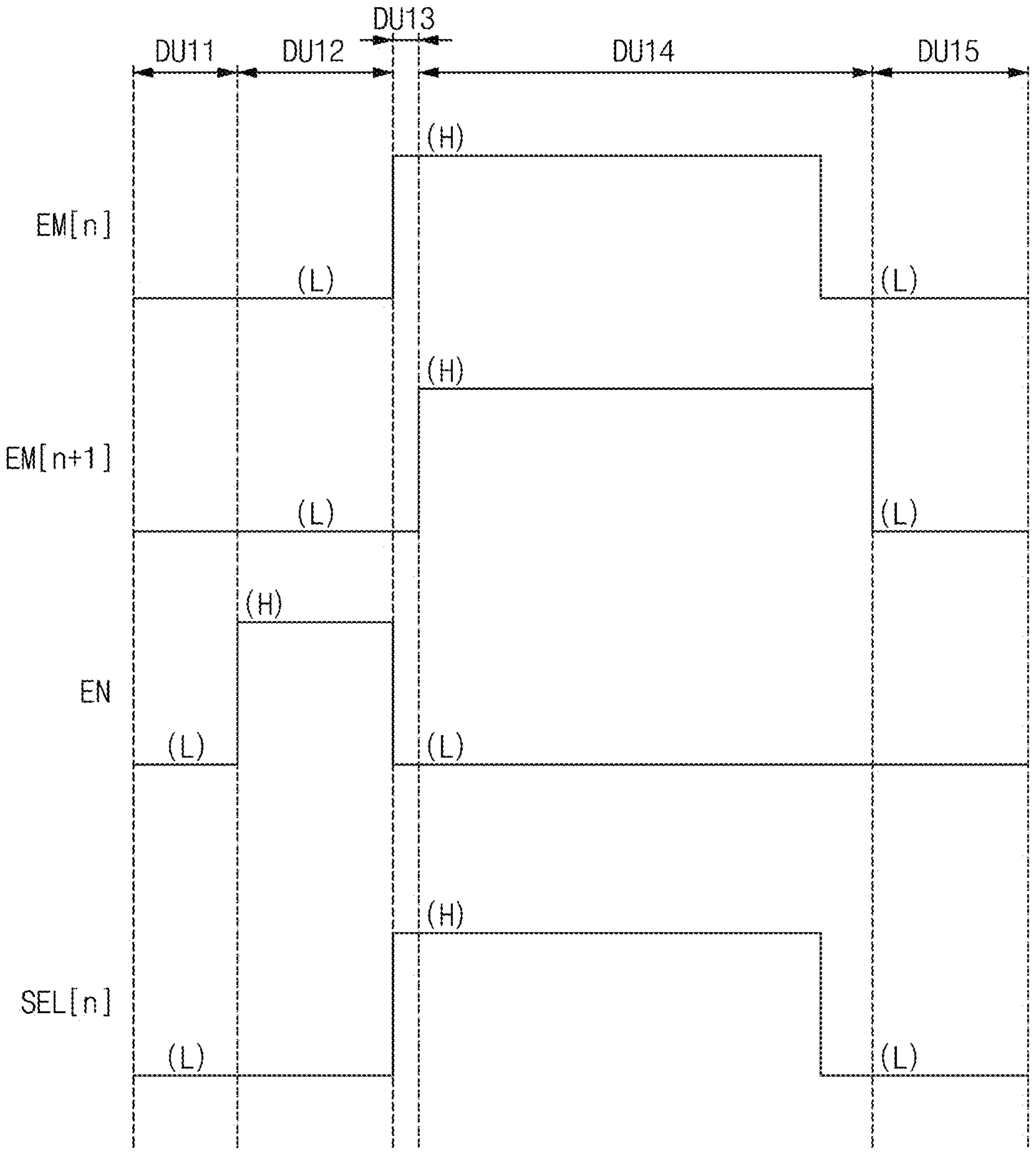
FIG. 23 is a timing diagram showing an output of a selection signal of FIG. 9 when a pulse of an enable signal of FIG. 9 is at a third position.
Figure 24:
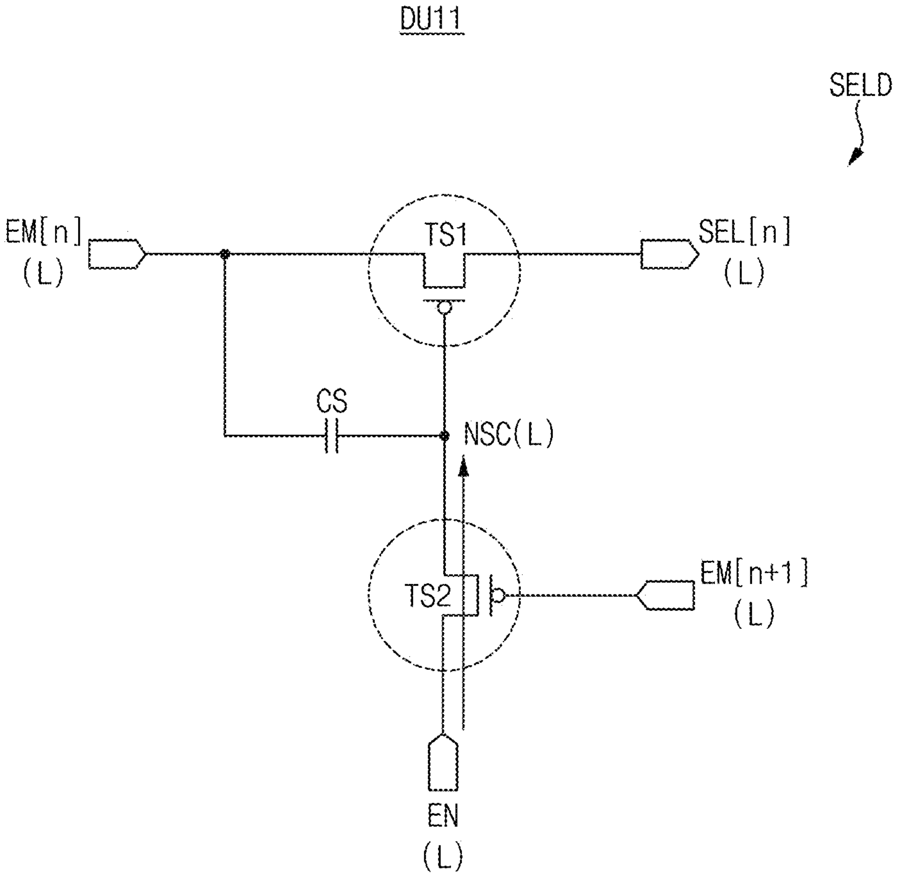
FIG. 24 is a circuit diagram showing an example of an operation of a selection driver of FIG. 9 in an eleventh duration of FIG. 23.
Figure 25:
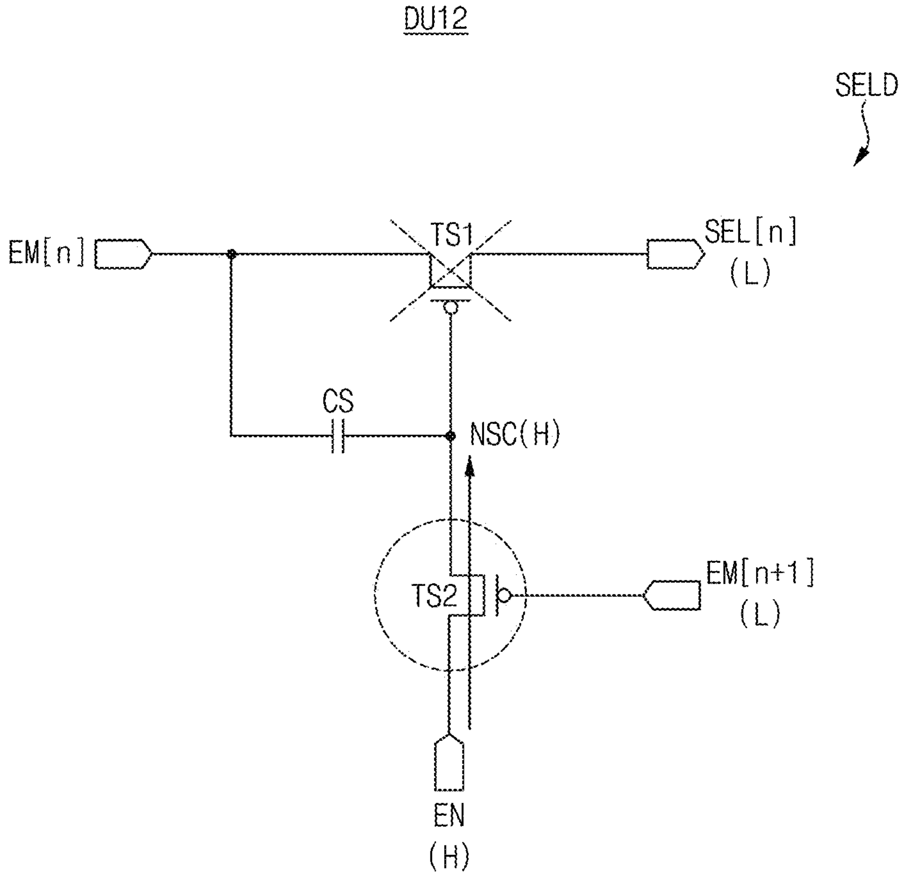
FIG. 25 is a circuit diagram showing an example of an operation of a selection driver of FIG. 9 in a twelfth duration of FIG. 23.
Figure 26:
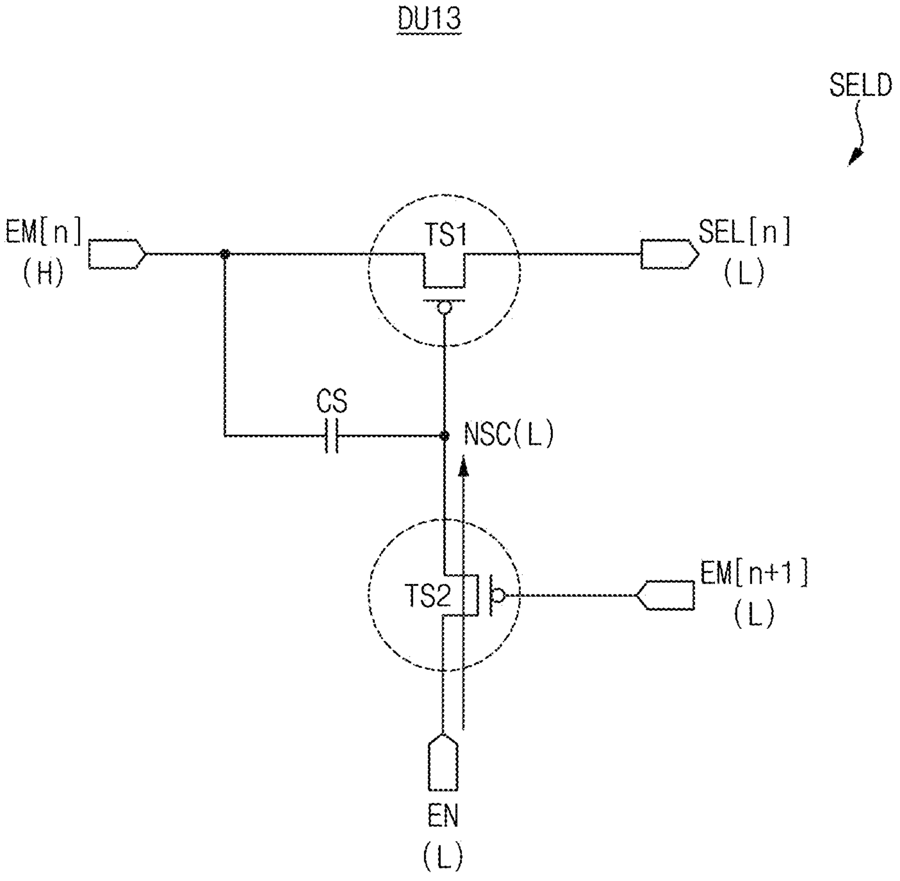
FIG. 26 is a circuit diagram showing an example of an operation of a selection driver of FIG. 9 in a thirteenth duration of FIG. 23.
Figure 27:
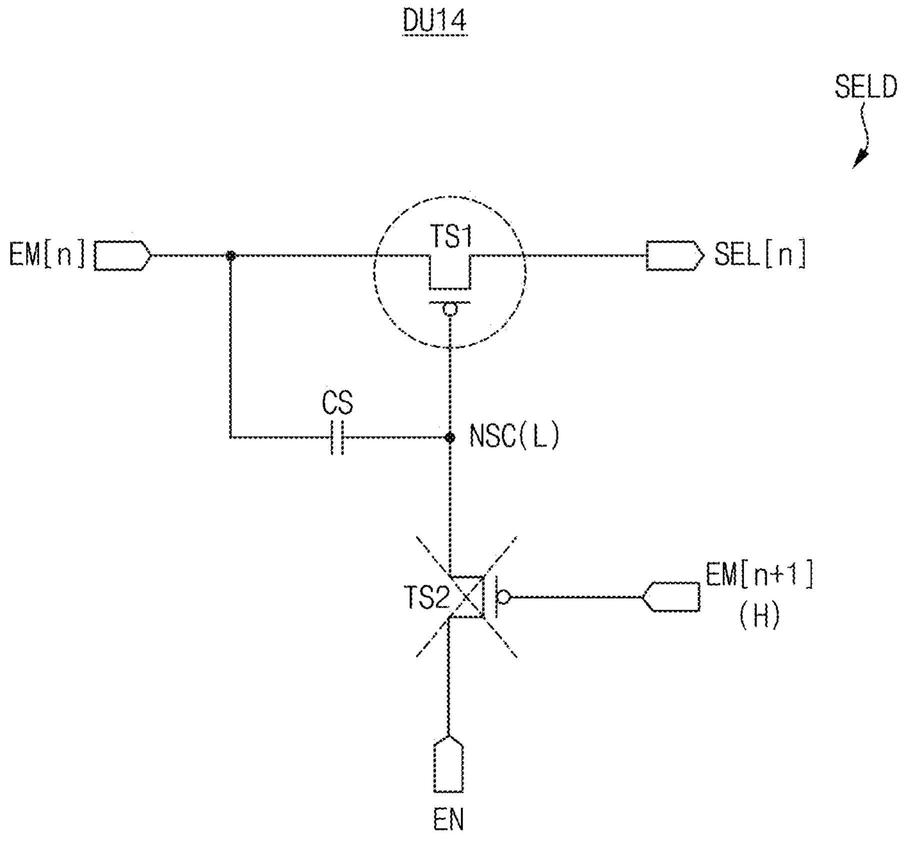
FIG. 27 is a circuit diagram showing an example of an operation of a selection driver of FIG. 9 in a fourteenth duration of FIG. 23.
Figure 28:
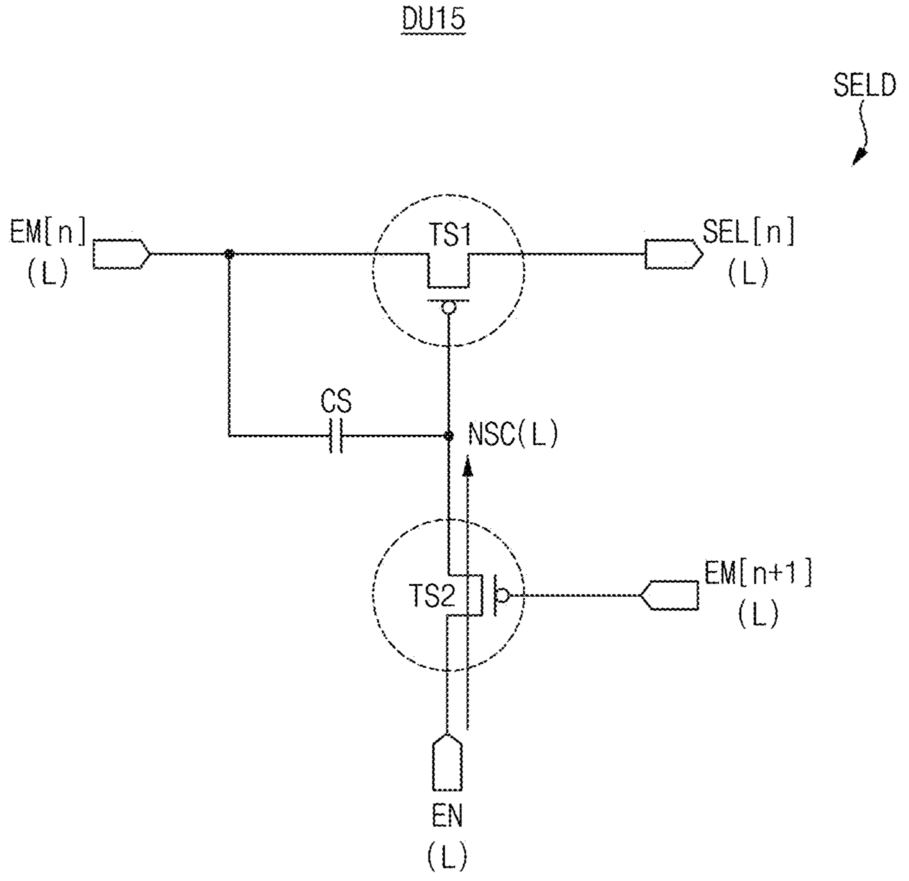
FIG. 28 is a circuit diagram showing an example of an operation of a selection driver of FIG. 9 in a fifteenth duration of FIG. 23.

FIG. 23 is a timing diagram showing an output of a selection signal SEL[n] of FIG. 9 when a pulse of an enable signal EN of FIG. 9 is at a third position. FIG. 24 is a circuit diagram showing an example of an operation of a selection driver SELD of FIG. 9 in an eleventh duration DU11 of FIG. 23. FIG. 25 is a circuit diagram showing an example of an operation of a selection driver SELD of FIG. 9 in a twelfth duration DU12 of FIG. 23. FIG. 26 is a circuit diagram showing an example of an operation of a selection driver SELD of FIG. 9 in a thirteenth duration DU13 of FIG. 23. FIG. 27 is a circuit diagram showing an example of an operation of a selection driver SELD of FIG. 9 in a fourteenth duration DU14 of FIG. 23. FIG. 28 is a circuit diagram showing an example of an operation of a selection driver SELD of FIG. 9 in a fifteenth duration DU15 of FIG. 23.

Referring to FIGS. 1 to 28, in the eleventh duration DU11, the next emission signal EM[n+1] and the enable signal EN may have the first level L. As described in the first duration DU1, when the next emission signal EM[n+1] and the enable signal EN have the first level L, the selection signal SEL[n] may be equal to the emission signal EM[n].

In the twelfth duration DU12, the next emission signal EM[n+1] may have the first level L, and the enable signal EN may have the second level H. As described in the eighth duration DU8, when the next emission signal EM[n+1] has the first level L and the enable signal EN has the second level H, the selection signal SEL[n] may maintain the previous state.

In the thirteenth duration DU13, the next emission signal EM[n+1] and the enable signal EN may have the first level L. As described in the first duration DU1, when the next emission signal EM[n+1] and the enable signal EN have the first level L, the selection signal SEL[n] may be equal to the emission signal EM[n].

In the fourteenth duration DU14, the next emission signal EM[n+1] may have the second level H, and the previous state of the voltage of the selection control node SC may be the first level L. As described above in reference to the second duration DU2, the next emission signal EM[n+1] having the second level H when the previous state of the voltage of the selection control node SC is the first level L may result in the selection signal SEL[n] being equal to the emission signal EM[n].

In the fifteenth duration DU15, the next emission signal EM[n+1] may have the first level L, and the enable signal EN may have the first level L. As described in reference to the first duration DU1, when the next emission signal EM[n+1] and the enable signal EN have the first level L, the selection signal SEL[n] may be equal to the emission signal EM[n].

As described in FIGS. 14 to 28, the output of the selection signal SEL[n] may be controlled based on the enable signal EN.

As such, the selection signal SEL[n] may be controlled based on the enable signal EN. In addition, when the selection signal SEL[n] has a pulse, the pulse of the selection signal SEL[n] and the pulse of the emission signal EM[n] may be equal in duration and have the same timing.

Figure 29:
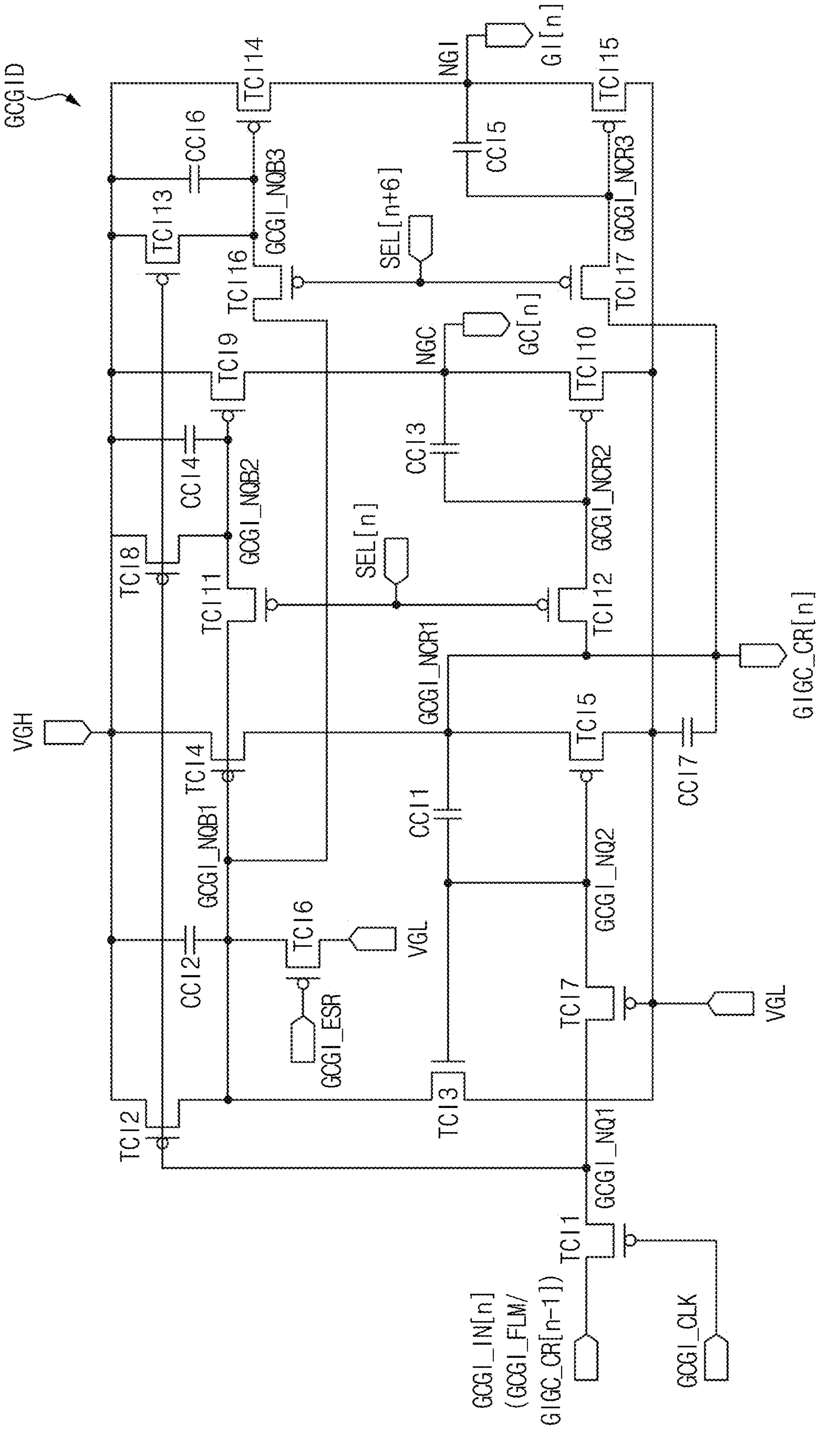
FIG. 29 is a circuit diagram showing a compensation initialization gate driver of FIG. 7.

FIG. 29 is a circuit diagram showing a compensation initialization gate driver GCGID of FIG. 7.

Referring to FIGS. 1 to 29, the compensation initialization gate driver GCGID may include compensation initialization stages (not shown). FIG. 29 shows an n-th compensation initialization gate stage. Here, n is a positive integer greater than or equal to 1.

The compensation initialization gate driver GCGID may include first to seventeenth compensation initialization transistors TCI1 to TCI17 and first to sixth compensation initialization capacitors CCI1 to CCI6.

The first compensation initialization transistor TCI1 may include a gate electrode receiving a compensation initialization clock signal GCGI_CLK, a first electrode receiving a compensation initialization input signal GCGI_IN[n], and a second electrode connected to a compensation initialization control node GCGI_NQ1, GCGI_NQ2. The first compensation initialization transistor TCI1 may be turned on in response to the compensation initialization clock signal GCGI_CLK to provide the compensation initialization input signal GCGI_IN[n] to the compensation initialization control node GCGI_NQ1, GCGI_NQ2. The compensation initialization input signal GCGI_IN[n] may be a compensation initialization start signal GCGI_FLM or a previous compensation initialization carry signal GCGI_CR[n−1]. When n is 1, the compensation initialization input signal GCGI_IN[n] may be the compensation initialization start signal GCGI_FLM. When n is 2 or more, the compensation initialization input signal GCGI_IN[n] may be the previous compensation initialization carry signal GCGI_CR[n−1].

The second compensation initialization transistor TCI2 may include a gate electrode connected to the compensation initialization control node GCGI_NQ1, GCGI_NQ2, a first electrode receiving a high gate voltage VGH, and a second electrode connected to the inverted compensation initialization control node GCGI_NQB1, GCGI_NQB2, GCGI_NQB3. The second compensation initialization transistor TCI2 may be turned on in response to a voltage of the compensation initialization control node GCGI_NQ1, GCGI_NQ2 to provide the high gate voltage VGH to the inverted compensation initialization control node GCGI_NQB1, GCGI_NQB2, GCGI_NQB3.

The third compensation initialization transistor TCI3 may include a gate electrode connected to the compensation initialization control node GCGI_NQ1, GCGI_NQ2, a first electrode receiving a low gate voltage VGL, and a second electrode connected to the inverted compensation initialization control node GCGI_NQB1, GCGI_NQB2, GCGI_NQB3. The third compensation initialization transistor TCI3 may be turned on in response to the voltage of the compensation initialization control node GCGI_NQ1, GCGI_NQ2 to provide the low gate voltage VGL to the inverted compensation initialization control node GCGI_NQB1, GCGI_NQB2, GCGI_NQB3.

The inverted compensation initialization control node GCGI_NQB1, GCGI_NQB2, GCGI_NQB3 may include a first inverted compensation initialization control node GCGI_NQB1, a second inverted compensation initialization control node GCGI_NQB2, and a third inverted compensation initialization control node GCGI_NQB3.

The fourth compensation initialization transistor TCI4 may include a gate electrode connected to the first inverted compensation initialization control node GCGI_NQB1, a first electrode receiving the high gate voltage VGH, and a second electrode connected to a compensation initialization carry output node GCGI_NCR1, GCGI_NCR2, GCGI_NCR3 outputting a compensation initialization carry signal GCGI_CR[n]. The fourth compensation initialization transistor TCI4 may be turned on in response to a voltage of the first inverted compensation initialization control node GCGI_NQB1 to provide the high gate voltage VGH to the compensation initialization carry output node GCGI_NCR1, GCGI_NCR2, GCGI_NCR3.

The fifth compensation initialization transistor TCI5 may include a gate electrode connected to the compensation initialization control node GCGI_NQ1, GCGI_NQ2, a first electrode receiving the low gate voltage VGL, and a second electrode connected to the compensation initialization carry output node GCGI_NCR1, GCGI_NCR2, GCGI_NCR3. The fifth compensation initialization transistor TCI5 may be turned on in response to the voltage of the compensation initialization control node GCGI_NQ1, GCGI_NQ2 to provide the low gate voltage VGL to the compensation initialization carry output node GCGI_NCR1, GCGI_NCR2, GCGI_NCR3. The sixth compensation initialization transistor TCI6 may include a gate electrode receiving a compensation initialization reset signal GCGI_ESR, a first electrode receiving the low gate voltage VGL, and a second electrode connected to the first inverted compensation initialization control node GCGI_NQB1.

The sixth compensation initialization transistor TCI6 may be turned on in response to the compensation initialization reset signal GCGI_ESR to provide the low gate voltage VGL to the first inverted compensation initialization control node GCGI_NQB1.

The compensation initialization control node GCGI_NQ1, GCGI_NQ2 may include a first compensation initialization control node GCGI_NQ1 and a second compensation initialization control node GCGI_NQ2.

The seventh compensation initialization transistor TCI7 may include a gate electrode receiving the low gate voltage VGL, a first electrode connected to the first compensation initialization control node GCGI_NQ1, and a second electrode connected to the second compensation initialization control node GCGI_NQ2. The seventh compensation initialization transistor TCI7 may be AOT.

The eighth compensation initialization transistor TCI8 may include a gate electrode connected to the compensation initialization control node GCGI_NQ1, GCGI_NQ2, a first electrode receiving the high gate voltage VGH, and a second electrode connected to the second inverted compensation initialization control node GCGI_NQB2. The eighth compensation initialization transistor TCI8 may be turned on in response to the voltage of the compensation initialization control node GCGI_NQ1, GCGI_NQ2 to provide the high gate voltage VGH to the second inverted compensation initialization control node GCGI_NQB2.

The ninth compensation initialization transistor TCI9 may include a gate electrode connected to the second inverted compensation initialization control node GCGI_NQB2, a first electrode receiving the high gate voltage VGH, and a second electrode connected to a compensation gate output node NGC outputting a compensation gate signal GC[n]. The ninth compensation initialization transistor TCI9 may be turned on in response to a voltage of the second inverted compensation initialization control node GCGI_NQB2 to provide the high gate voltage VGH to the compensation gate output node NGC.

The compensation initialization carry output node GCGI_NCR1, GCGI_NCR2, GCGI_NCR3 may include a first compensation initialization carry output node GCGI_NCR1, a second compensation initialization carry output node GCGI_NCR2, and a third compensation initialization carry output node GCGI_NCR3.

The tenth compensation initialization transistor TCI10 may include a gate electrode connected to the second compensation initialization carry output node GCGI_NCR2, a first electrode receiving the low gate voltage VGL, and a second electrode connected to the compensation gate output node NGC. The tenth compensation initialization transistor TCI10 may be turned on in response to a voltage of the second compensation initialization carry output node GCGI_NCR2 to provide the low gate voltage VGL to the compensation gate output node NGC.

The eleventh compensation initialization transistor TCI11 may include a gate electrode receiving a selection signal SEL[n], a first electrode connected to the first inverted compensation initialization control node GCGI_NQB1, and a second electrode connected to the second inverted compensation initialization control node GCGI_NQB2. The eleventh compensation initialization transistor TCI11 may control the voltage of the second inverted compensation initialization control node GCGI_NQB2 based on the selection signal SEL[n]. For example, the eleventh compensation initialization transistor TCI11 may be turned on in response to the selection signal SEL[n] to transmit the voltage of the first inverted compensation initialization control node GCGI_NQB1 to the second inverted compensation initialization control node GCGI_NQB2.

The twelfth compensation initialization transistor TCI12 may include a gate electrode receiving the selection signal SEL[n], a first electrode connected to the first compensation initialization carry output node GCGI_NCR1, and a second electrode connected to the second compensation initialization carry output node GCGI_NCR2. The twelfth compensation initialization transistor TCI12 may control the voltage of the second compensation initialization carry output node GCGI_NCR2 based on the selection signal SEL[n]. For example, the twelfth compensation initialization transistor TCI12 may transmit the voltage of the first compensation initialization carry output node GCGI_NCR1 to the second compensation initialization carry output node GCGI_NCR2 in response to the selection signal SEL[n].

The thirteenth compensation initialization transistor TCI13 may include a gate electrode connected to the compensation initialization control node GCGI_NQ1, GCGI_NQ2, a first electrode receiving the high gate voltage VGH, and a second electrode connected to the third inverted compensation initialization control node GCGI_NQB3. The thirteenth compensation initialization transistor TCI13 may be turned on in response to the voltage of the compensation initialization control node GCGI_NQ1, GCGI_NQ2 to provide the high gate voltage VGH to the third inverted compensation initialization control node GCGI_NQB3.

The fourteenth compensation initialization transistor TCI14 may include a gate electrode connected to the third inverted compensation initialization control node GCGI_NQB3, a first electrode receiving the high gate voltage VGH, and a second electrode connected to an initialization gate output node NGI outputting an initialization gate signal GCI[n]. The fourteenth compensation initialization transistor TCI14 may be turned on in response to a voltage of the third inverted compensation initialization control node GCGI_NQB3 to provide the high gate voltage VGH to the initialization gate output node NGI.

The fifteenth compensation initialization transistor TCI15 may include a gate electrode connected to the third compensation initialization carry output node GCGI_NCR3, a first electrode receiving the low gate voltage VGL, and a second electrode connected to the initialization gate output node NGI. The fifteenth compensation initialization transistor TCI15 may be turned on in response to a voltage of the third compensation initialization carry output node GCGI_NCR3 to provide the low gate voltage VGL to the initialization gate output node NGI.

The sixteenth compensation initialization transistor TCI16 may include a gate electrode receiving a next selection signal SEL[n+6], a first electrode connected to the first inverted compensation initialization control node GCGI_NQB1, and a second electrode connected to the third inverted compensation initialization control node GCGI_NQB3. The sixteenth compensation initialization transistor TCI16 may control a voltage of the third inverted compensation initialization control node GCGI_NQB3 based on the next selection signal SEL[n+6]. For example, the sixteenth compensation initialization transistor TCI16 may be turned on in response to the next selection signal SEL[n+6] to transmit the voltage of the first inverted compensation initialization control node GCGI_NQB1 to the third inverted compensation initialization control node GCGI_NQB3.

The seventeenth compensation initialization transistor TCI17 may include a gate electrode receiving the next selection signal SEL[n+6], a first electrode connected to the first compensation initialization carry output node GCGI_NCR1, and a second electrode connected to the third compensation initialization carry output node GCGI_NCR3. The seventeenth compensation initialization transistor TCI17 may control a voltage of the third compensation initialization carry output node GCGI_NCR3 based on the next selection signal SEL[n+6]. For example, the seventeenth compensation initialization transistor TCI17 may be turned on in response to the next selection signal SEL[n+6] to transfer the voltage of the first compensation initialization carry output node GCGI_NCR1 to the third compensation initialization carry output node GCGI_NCR3.

The first compensation initialization capacitor CCI1 may include a first electrode connected to the compensation initialization control node GCGI_NQ1, GCGI_NQ2 and a second electrode connected to the first compensation initialization carry output node GCGI_NCR1.

The second compensation initialization capacitor CCI2 may include a first electrode receiving the high gate voltage VGH and a second electrode connected to the first inverted compensation initialization control node GGCGI_NQB1.

The third compensation initialization capacitor CCI3 may include a first electrode connected to the second compensation initialization carry output node GCGI_NCR2 and a second electrode connected to the compensation gate output node NGC.

The fourth compensation initialization capacitor CCI4 may include a first electrode receiving the high gate voltage VGH and a second electrode connected to the second inverted compensation initialization control node GGCGI_NQB2.

The fifth compensation initialization capacitor CCI5 may include a first electrode connected to the third compensation initialization carry output node GCGI_NCR3 and a second electrode connected to the initialization gate output node NGI.

The sixth compensation initialization capacitor CCI6 may include a first electrode receiving the high gate voltage VGH and a second electrode connected to the third inverted compensation initialization control node GGCGI_NQB3.

The seventh compensation initialization capacitor CCI7 may include a first electrode receiving the low gate voltage VGL and a second electrode connected to the first compensation initialization carry output node GCGI_NCR1.

In an embodiment, the first, second, and fourth to seventeenth compensation initialization transistors TCI1, TCI2, TCI4 to TCI17 may be P-type transistors, and the third compensation initialization transistor TCI4 may be an N-type transistor. For example, the P-type transistor may be a PMOS transistor. For example, the N-type transistor may be an NMOS transistor. However, the present inventive concept is not limited thereto.

In FIG. 29, the compensation initialization gate driver GCGID is illustrated as including 17 transistors TCI1 to TCI17 and 7 capacitors CCI1 to CCI7 but the present inventive concept is not limited thereto. The compensation initialization gate driver GCGID may have any configuration in which an output of a compensation gate signal GC and an output of an initialization gate signal GI are controlled based on the selection signal SEL.

As such, the compensation gate signal GC and the initialization gate signal GI may be masked based on the selection signal SEL.

Figure 30:
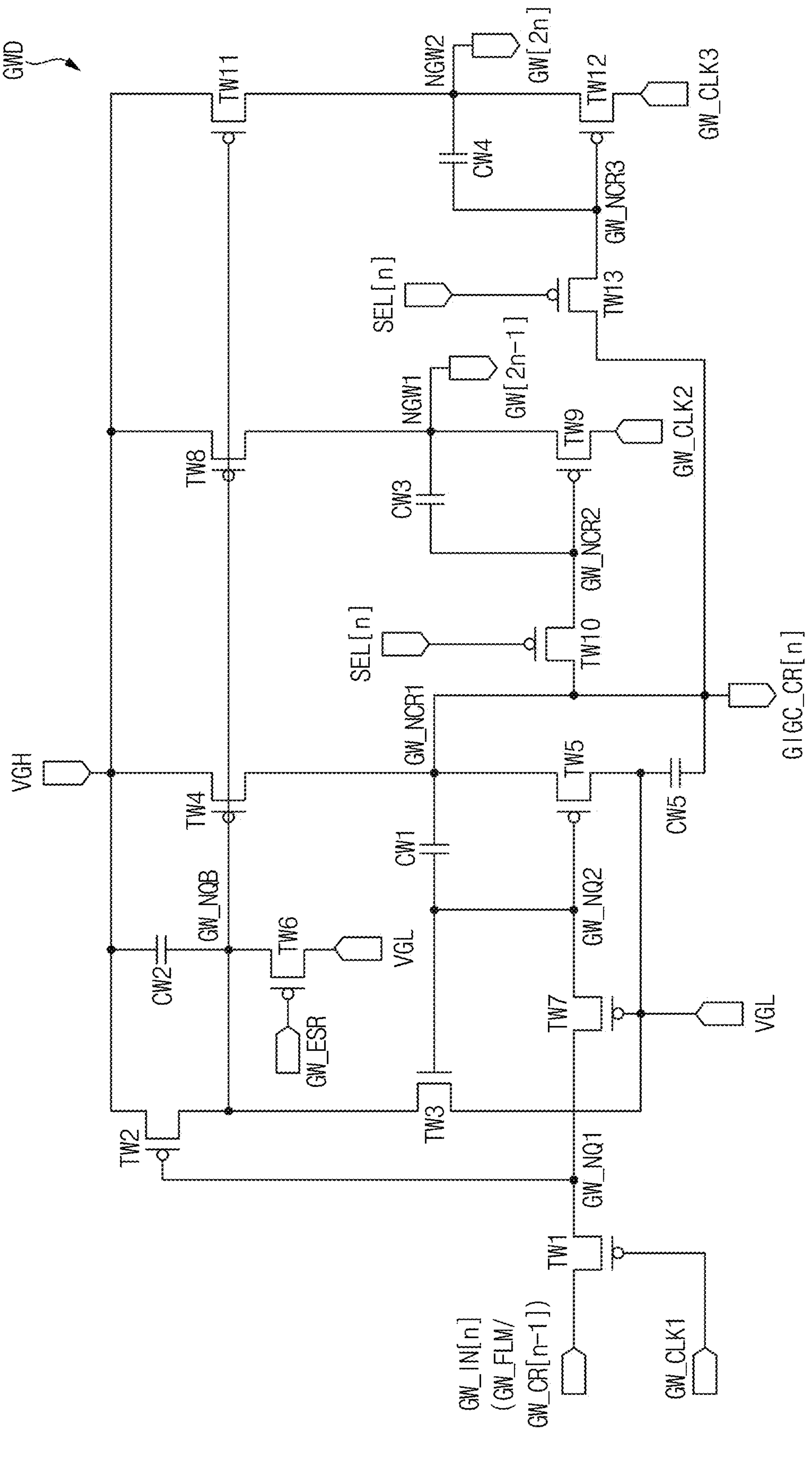
FIG. 30 is a circuit diagram showing a write gate driver of FIG. 7.

FIG. 30 is a circuit diagram showing a write gate driver GWD of FIG. 7.

Referring to FIGS. 1 to 30, the write gate driver GWD may include write stages (not shown). FIG. 26 shows an n-th write gate stage. Here, n is a positive integer greater than or equal to 1.

The write gate driver GWD may include first to thirteenth write transistors TW1 to TW13 and first to fourth write capacitors CW1 to CW4.

The first write transistor TW1 may include a gate electrode receiving a first write clock signal GW_CLK1, a first electrode receiving a write input signal GW_IN[n], and a second electrode connected to a write control node GW_NQ1, GW_NQ2. The first write transistor TW1 may be turned on in response to the first write clock signal GW_CLK1 to provide the write input signal GW_IN[n] to the write control node GW_NQ1, GW_NQ2. The write input signal GW_IN[n] may be a write start signal GW_FLM or a previous write carry signal GW_CR[n−1]. When n is 1, the write input signal GW_IN[n] may be the write start signal GW_FLM. When n is 2 or more, the write input signal GW_IN[n] may be the previous write carry signal GW_CR[n−1].

The second write transistor TW2 may include a gate electrode connected to the write control node GW_NQ1, GW_NQ2, a first electrode receiving a high gate voltage VGH, and a second electrode connected to the inverted write control node GW_NQB. The second write transistor TW2 may be turned on in response to a voltage of the write control node GW_NQ1, GW_NQ2 to provide the high gate voltage VGH to the inverted write control node GW_NQB.

The third write transistor TW3 may include a gate electrode connected to the write control node GW_NQ1, GW_NQ2, a first electrode receiving a low gate voltage VGL, and a second electrode connected to the inverted write control node GW_NQB. The third write transistor TW3 may be turned on in response to the voltage of the write control node GW_NQ1, GW_NQ2 to provide the low gate voltage VGL to the inverted write control node GW_NQB.

The fourth write transistor TW4 may include a gate electrode connected to the inverted write control node GW_NQB, a first electrode receiving the high gate voltage VGH, and a second electrode connected to a write carry output node GW_NCR1, GW_NCR2, GW_NCR3 that outputs a write carry signal GW_CR[n]. The fourth write transistor TW4 may be turned on in response to a voltage of the inverted write control node GW_NQB to provide the high gate voltage VGH to the write carry output node GW_NCR1, GW_NCR2, GW_NCR3.

The fifth write transistor TW5 may include a gate electrode connected to the write control node GW_NQ1, GW_NQ2, a first electrode receiving the low gate voltage VGL, and a second electrode connected to the write carry output node GW_NCR1, GW_NCR2, GW_NCR3. The fifth write transistor TW5 may be turned on in response to the voltage of the write control node GW_NQ1, GW_NQ2 to provide the low gate voltage VGL to the write carry output node GW_NCR1, GW_NCR2, GW_NCR3.

The sixth write transistor TW6 may include a gate electrode receiving a write reset signal GW_ESR, a first electrode receiving the low gate voltage VGL, and a second electrode connected to the inverted write control node GW_NQB. The sixth write transistor TW6 may be turned on in response to the write reset signal GW_ESR to provide the low gate voltage VGL to the inverted write control node GW_NQB.

The write control node GW_NQ1, GW_NQ2 may include a first write control node GW_NQ1 and a second write control node GW_NQ2.

The seventh write transistor TW7 may include a gate electrode receiving the low gate voltage VGL, a first electrode connected to the first write control node GW_NQ1, and a second electrode connected to the second write control node GW_NQ2. The seventh write transistor TW7 may be AOT.

The eighth write transistor TW8 may include a gate electrode connected to the inverted write control node GW_NQB, a first electrode receiving the high gate voltage VGH, and a second electrode connected to a first write gate output node NGW1 outputting a write gate signal GW[2n−1]. The eighth write transistor TW8 may be turned on in response to the voltage of the inverted write control node GW_NQB to provide the high gate voltage VGH to the first write gate output node NGW1.

The write carry output node GW_NCR1, GW_NCR2, GW_NCR3 may include a first write carry output node GW_NCR1, a second write carry output node GW_NCR2, and a third write carry output node GW_NCR3.

The ninth write transistor TW9 may include a gate electrode connected to the second write carry output node GW_NCR2, a first electrode receiving a second write clock signal GW_CLK2, and a second electrode connected to the first write gate output node NGW1. The ninth write transistor TW9 may be turned on in response to a voltage of the second write carry output node GW_NCR2 to provide the second write clock signal GW_CLK2 to the first write gate output node NGW1.

The tenth write transistor TW10 may include a gate electrode receiving a selection signal SEL[n], a first electrode connected to the first write carry output node GW_NCR1, and a second electrode connected to the second write carry output node GW_NCR2. The tenth write transistor TW10 may control the voltage of the second write carry output node GW_NCR2 based on the selection signal SEL[n]. For example, the tenth write transistor TW10 may be turned on in response to the selection signal SEL[n] to transfer the voltage of the first write carry output node GW_NCR1 to the second write carry output node GW_NCR2.

The eleventh write transistor TW11 may include a gate electrode connected to the inverted write control node GW_NQB, a first electrode receiving the high gate voltage VGH, and a second electrode connected to a second write gate output node NGW2 outputting a next write gate signal GW[2n]. The eleventh write transistor TW11 may be turned on in response to the voltage of the inverted write control node GW_NQB to provide the high gate voltage VGH to the second write gate output node NGW2.

The twelfth write transistor TW12 may include a gate electrode connected to the third write carry output node GW_NCR3, a first electrode receiving a third write clock signal GW_CLK3, and a second electrode connected to the second write gate output node NGW2. The twelfth write transistor TW12 may be turned on in response to a voltage of the third write carry output node GW_NCR3 to provide the third write clock signal GW_CLK3 to the second write gate output node NGW2.

The thirteenth write transistor TW13 may include a gate electrode receiving the selection signal SEL[n], a first electrode connected to the first write carry output node GW_NCR1, and a second electrode connected to the third write carry output node GW_NCR3. The thirteenth write transistor TW13 may control the voltage of the third write carry output node GW_NCR3 based on the selection signal SEL[n]. For example, the thirteenth write transistor TW13 may be turned on in response to the selection signal SEL[n] to transfer the voltage of the first write carry output node GW_NCR1 to the third write carry output node GW_NCR3.

The first write capacitor CW1 may include a first electrode connected to the write control node GW_NQ1, GW_NQ2 and a second electrode connected to the first write carry output node GW_NCR1.

The second write capacitor CW2 may include a first electrode receiving the high gate voltage VGH and a second electrode connected to the inverted write control node GW_NQB.

The third write capacitor CW3 may include a first electrode connected to the second write carry output node GW_NCR2 and a second electrode connected to the first write gate output node NGW1.

The fourth write capacitor CW4 may include a first electrode connected to the third write carry output node GW_NCR3 and a second electrode connected to the second write gate output node NGW2.

The fifth write capacitor CW5 may include a first electrode receiving the low gate voltage VGL and a second electrode connected to the first write carry output node GW_NCR1.

In an embodiment, the first, second, and fourth to thirteenth write transistors TW1, TW2, TW4 to TW13 may be P-type transistors, and the third write transistor TW3 may be an N-type transistor. For example, the P-type transistor may be a PMOS transistor. For example, the N-type transistor may be an NMOS transistor. However, the present inventive concept is not limited thereto.

Although the write gate driver GWD in FIG. 30 is shown as including thirteen transistors TW1 to TW13 and five capacitors CW1 to CW5, the present inventive concept is not limited thereto. The write gate driver GWD may have any configuration in which an output of a write gate signal GW is controlled based on the selection signal SEL.

As such, the write gate signal GW may be masked based on the selection signal SEL.

Figure 31:
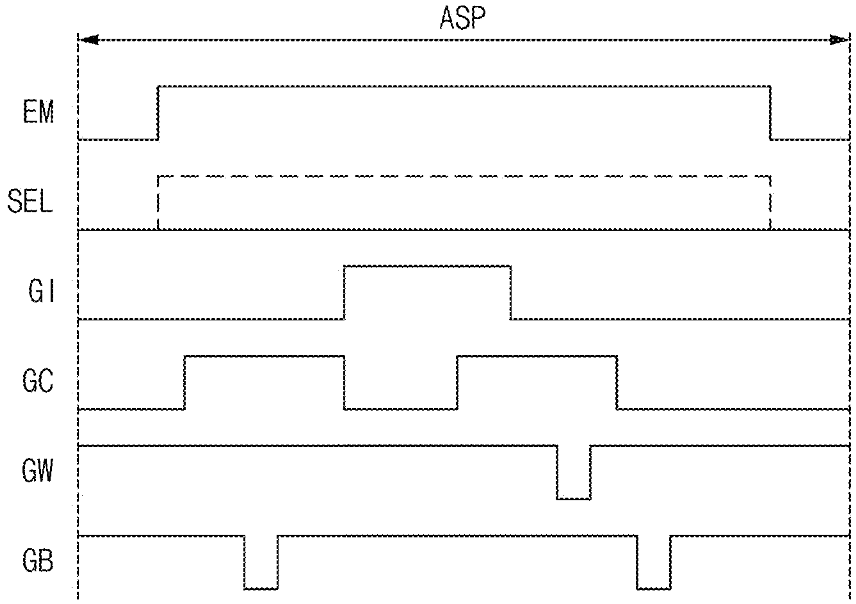
FIG. 31 is a timing diagram showing signals applied to a pixel of FIG. 2 according to a selection signal in an address scan period of FIG. 4.
Figure 32:
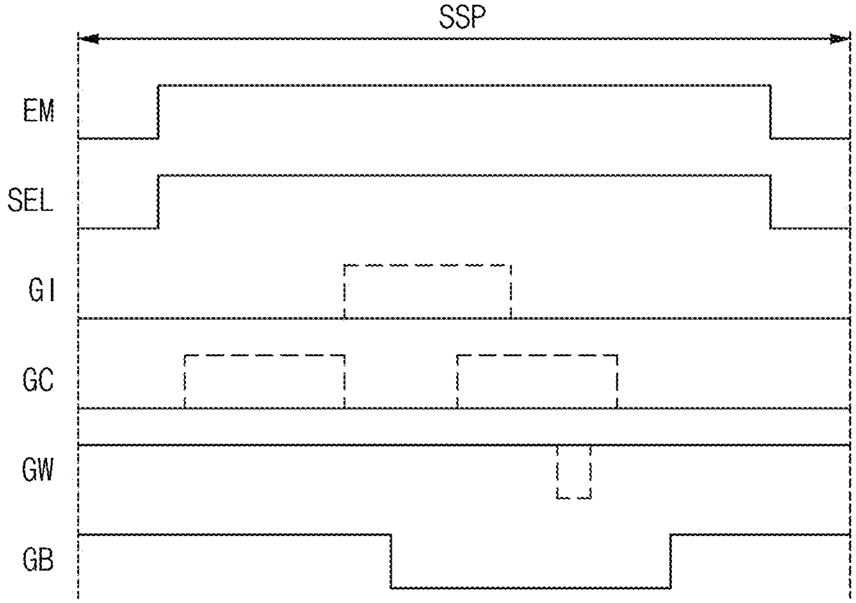
FIG. 32 is a timing diagram showing signals applied to a pixel of FIG. 2 according to a selection signal in a self-scan period of FIG. 4.

FIG. 31 is a timing diagram showing signals GW, GC, GI, GB, EM applied to a pixel of FIG. 2 according to a selection signal SEL in an address scan period ASP of FIG. 4. FIG. 32 is a timing diagram showing signals GW, GC, GI, GB, EM applied to a pixel of FIG. 2 according to a selection signal SEL in a self-scan period SSP of FIG. 4.

Referring to FIGS. 1 to 32, in an address scan period ASP, the selection signal SEL may have a first level L. As described above, when the selection signal SEL has the first level L, the initialization gate signal GI, the compensation gate signal GC, and the write gate signal GW may not be masked by the selection signal SEL.

On the other hand, in the self-scan period SSP, the selection signal SEL may be generated based on the emission signal EM. Therefore, when the selection signal SEL has a pulse, the pulse of the selection signal SEL and the pulse of the emission signal EM may be equal in duration and timing. Accordingly, a duration in which the selection signal SEL has a second level H (i.e., a high level) may equal to a duration in which the emission signal EM has the second level H (i.e., the high level). In addition, the selection signal SEL may be a sequential scan signal. Therefore, A duration in which the selection signal SEL has the second level H may include a duration in which the write gate signal GW has an activation pulse, a duration in which the compensation gate signal GC has activation pulses, and a duration in which the initialization gate signal GI has an activation pulse. Accordingly, the activation pulse of the write gate signal GW, the activation pulses of the compensation gate signal GC, and the activation pulse of the initialization gate signal GI may be masked without a malfunction in which only a part of the activation pulses are masked by the selection signal SEL. That is, a masking operation may execute normally. Accordingly, each of the write gate signal GW, the compensation gate signal GC, and the initialization gate signal GI may be masked to have only an inactive level.

Figure 33:
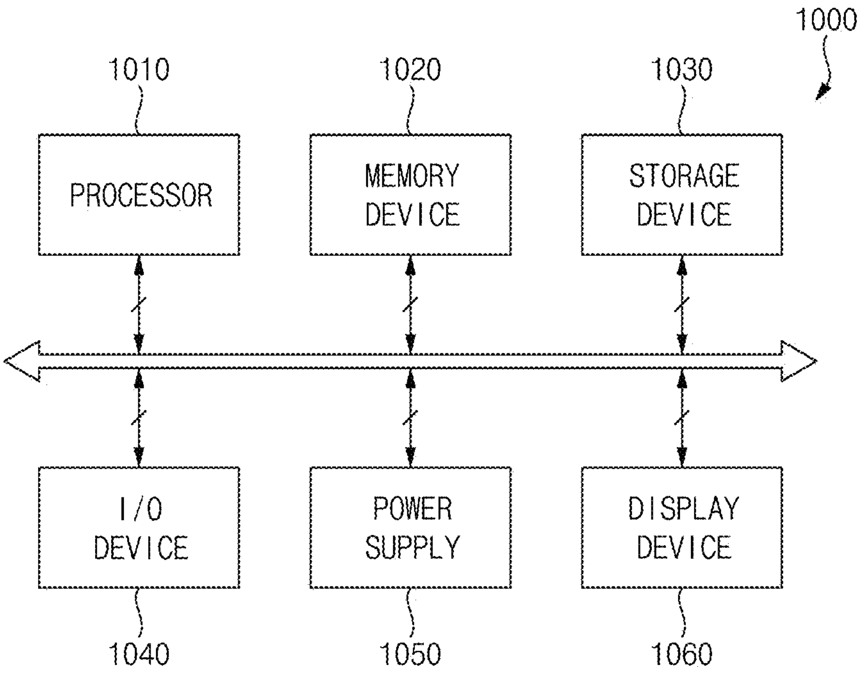
FIG. 33 is a block diagram showing an electronic device.
Figure 34:
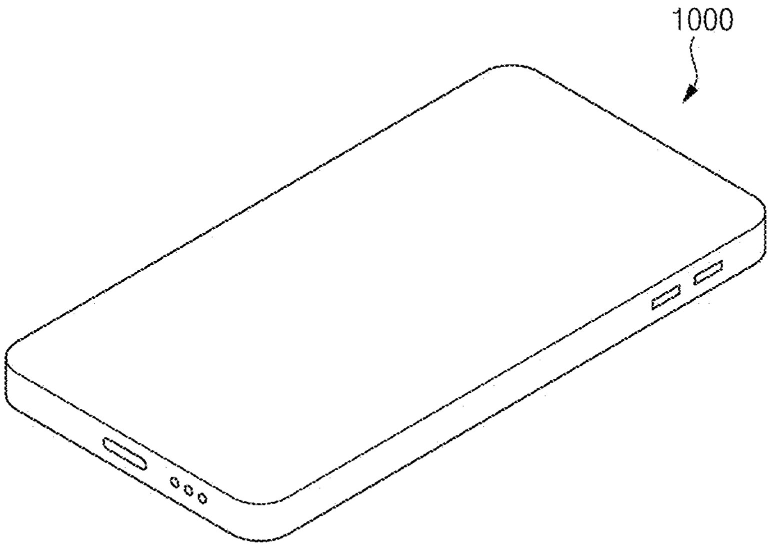
FIG. 34 is a diagram showing an embodiment in which an electronic device of FIG. 33 is implemented as a smart phone.

FIG. 33 is a block diagram showing an electronic device 1000. FIG. 34 is a diagram showing an embodiment in which an electronic device 1000 of FIG. 33 is implemented as a smart phone.

Referring to FIGS. 33 and 34, the electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In an embodiment, as illustrated in FIG. 34, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a micro processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to mobile phones, smart phones, tablet computers, mobile communication terminals, electronic notebooks, e-books, portable multimedia players (PMPs), navigations, and ultra mobile PCs (MPCs) as well as digital televisions (TVs), 3D TVs, laptops, monitors, billboards, Internet of Things (IoT), home appliances, personal digital assistants (PDAs), digital cameras, music players, portable game consoles, etc. The inventive concepts may also be applied to wearable devices such as smart watches, watch phones, glasses-type displays, or head mounted displays (HMDs). The inventive concepts may also be used in dashboards of vehicles, center information displays (CIDs) of the center fascia or dashboards of vehicles, mirror displays that replace the side view mirrors of vehicles, and display screens arranged on the rear sides of front seats to serve as entertainment devices for back seat passengers of vehicles.

The foregoing is illustrative of the inventive concept and is not to be construed as limiting. Those skilled in the art will appreciate that many modifications are possible to the embodiments without materially departing from the novel teachings and advantages of the inventive concept. Accordingly, all such modifications are intended to be included within the scope of the inventive concept as defined in the claims. In the claims, any means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. An emission selection driver comprising:

an emission driver configured to output an emission signal from an emission output node; and a selection driver connected to the emission output node and configured to output a selection signal based on a next emission signal and an enable signal, wherein the selection signal outputs a first level when the next emission signal and the enable signal have the first level, and wherein a pulse of the selection signal and a pulse of the emission signal are equal in duration and timing.

2. The emission selection driver of claim 1, wherein the enable signal is a global scan signal, and the emission signal, the next emission signal, and the selection signal are progressive scan signals.

3. The emission selection driver of claim 1, wherein the emission driver includes:

a first emission transistor including a gate electrode receiving an emission clock signal, a first electrode receiving an emission input signal, and a second electrode connected to an emission control node;

a second emission transistor including a gate electrode connected to the emission control node, a first electrode receiving a high gate voltage, and a second electrode connected to an inverted emission control node;

a third emission transistor including a gate electrode connected to the emission control node, a first electrode receiving a low gate voltage, and a second electrode connected to the inverted emission control node;

a fourth emission transistor including a gate electrode connected to the inverted emission control node, a first electrode receiving the high gate voltage, and a second electrode connected to an emission output node outputting the emission signal;

a fifth emission transistor including a gate electrode connected to the emission control node, a first electrode receiving the low gate voltage, and a second electrode connected to the emission output node;

a first emission capacitor including a first electrode connected to the emission control node and a second electrode connected to the emission output node; and a second emission capacitor including a first electrode receiving the high gate voltage and a second electrode connected to the inverted emission control node.

4. The emission selection driver of claim 3, wherein the emission control node includes a first emission control node and a second emission control node, and wherein the emission driver includes:

a sixth emission transistor including a gate electrode receiving the low gate voltage, a first electrode connected to the first emission control node, and a second electrode connected to the second emission control node.

5. The emission selection driver of claim 1, wherein the emission selection driver is part of one of a mobile phone, a tablet, a mobile communication terminal, an electronic notebook, an e-book, a portable multimedia player, a navigation device, an ultra mobile personal computer, a television, a laptop, a monitor, a billboard, an Internet of Things device, a smart watch, a watch phone, glasses, a head mounted display, a vehicle dashboard, a vehicle mirror display, and vehicle entertainment display.

6. An emission selection driver comprising:

an emission driver configured to output an emission signal from an emission output node; and a selection driver connected to the emission output node and configured to output a selection signal based on a next emission signal and an enable signal, wherein the selection driver includes:

a first selection transistor including a gate electrode connected to a selection control node, a first electrode receiving the emission signal, and a second electrode outputting the selection signal;

a second selection transistor including a gate electrode receiving the next emission signal, a first electrode receiving the enable signal, and a second electrode connected to the selection control node; and a selection capacitor including a first electrode receiving the emission signal and a second electrode connected to the selection control node.

7. The emission selection driver of claim 6, wherein the first selection transistor and the second selection transistor are P-type transistors.

8. The emission selection driver of claim 6 wherein, when the next emission signal maintains a first level, the selection signal is equal to the emission signal.

9. The emission selection driver of claim 6 wherein, when the next emission signal and the enable signal have a first level, the selection signal is equal to the emission signal.

10. The emission selection driver of claim 9, wherein the second selection transistor is turned on in response to the next emission signal having the first level to provide the enable signal having the first level to the selection control node, and the first selection transistor is turned on in response to a voltage of the selection control node having the first level to output the emission signal as the selection signal.

11. The emission selection driver of claim 6 wherein, when the next emission signal has a first level and the enable signal has a second level, the selection signal maintains a previous state.

12. The emission selection driver of claim 11, wherein the second selection transistor is turned on in response to the next emission signal having the first level to provide the enable signal having the second level to the selection control node, and the first selection transistor is turned off in response to a voltage of the selection control node having the second level.

13. The emission selection driver of claim 6 wherein, when the next emission signal has a second level, a voltage of the selection control node maintains a previous state.

14. The emission selection driver of claim 13 wherein, when the previous state of the voltage of the selection control node is the first level, the selection signal is equal to the emission signal.

15. The emission selection driver of claim 14, wherein the second selection transistor is turned off in response to the next emission signal having the second level, and the first selection transistor is turned on in response to the previous state of the voltage of the selection control node having the first level to output the emission signal as the selection signal.

16. The emission selection driver of claim 13, wherein, when the previous state of the voltage of the selection control node is the second level, the selection signal maintains the previous state.

17. The emission selection driver of claim 16, wherein the second selection transistor is turned off in response to the next emission signal having the second level, and the first selection transistor is turned off in response to the previous state of the voltage of the selection control node having the second level.

18. An emission selection gate driver comprising:

an emission driver configured to output an emission signal from an emission output node;

a selection driver connected to the emission output node and configured to output a selection signal based on a next emission signal and an enable signal; and a gate driver configured to output a gate signal that is masked based on the selection signal, wherein a pulse of the selection signal and a pulse of the emission signal are equal in duration and timing.

19. The emission selection gate driver of claim 18, wherein the enable signal is a global scan signal, and the emission signal, the next emission signal, and the selection signal are progressive scan signals.

20. The emission selection gate driver of claim 18, wherein the selection driver includes:

a first selection transistor including a gate electrode connected to a selection control node, a first electrode receiving the emission signal, and a second electrode outputting the selection signal;

a second selection transistor including a gate electrode receiving the next emission signal, a first electrode receiving the enable signal, and a second electrode connected to the selection control node; and a selection capacitor including a first electrode receiving the emission signal and a second electrode connected to the selection control node.

21. The emission selection gate driver of claim 18, wherein a duration in which the selection signal has a second level includes activation pulses of the gate signal.

* * * * *